United States Patent
Park et al.

(10) Patent No.: US 8,853,347 B2
(45) Date of Patent: Oct. 7, 2014

(54) ORGANIC SEMICONDUCTOR COMPOUND, ORGANIC THIN FILM INCLUDING THE ORGANIC SEMICONDUCTOR COMPOUND AND ELECTRONIC DEVICE INCLUDING THE ORGANIC THIN FILM, AND METHOD OF MANUFACTURING THE ORGANIC THIN FILM

(75) Inventors: Jeong il Park, Seongnam-si (KR); Bang Lin Lee, Suwon-si (KR); Jong Won Chung, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 210 days.

(21) Appl. No.: 13/569,552

(22) Filed: Aug. 8, 2012

(65) Prior Publication Data

US 2013/0137848 A1 May 30, 2013

(30) Foreign Application Priority Data

Nov. 24, 2011 (KR) .................. 10-2011-0123875

(51) Int. Cl.
*C08G 75/00* (2006.01)

(52) U.S. Cl.
USPC ........... 528/377; 528/378; 528/380; 136/263; 257/40; 257/E51.005; 257/E51.004; 313/504; 977/734; 977/948

(58) Field of Classification Search
USPC ........... 528/377, 378, 380; 257/40, E51.005, 257/E51.024; 136/263; 313/504; 977/734, 977/948
See application file for complete search history.

(56) References Cited

U.S. PATENT DOCUMENTS 6,166,172 A    12/2000    McCullough et al.

FOREIGN PATENT DOCUMENTS

EP    0625511 A1    11/1994

OTHER PUBLICATIONS

Yamamoto et al., "Preparation of π-Conjugated Poly(thiophene-2,5-diyl), Poly(p-pheylene), and Related Polymers Using Zerovalent Nickel Complexes. Linear Structure and Properties of the π-Conjugated Polymers," *Macromolecules*, 1992, vol. 25, pp. 1214-1223.
Bundgaard et al., "Low-Band-Gap Conjugated Polymers Based on Thiophene, Benzothiadiazole, and Benzobis(thiadiazole)," *Macromolecules*, 2006, vol. 39, pp. 2823-2831.
Miyaura et al., "Palladium-Catalyzed Inter- and Intramolecular Cross-Coupling Reactions of B-Akyl-9-borabicyclo[3.3.1]nonane Derivatives with 1-Halo-1-alkenes or Haloarenes. Syntheses of Functionalized Alkenes, Arenes, and Cycloalkenes via a Hydroboration-Coupling Sequence," *J. Am. Chem. Soc.*, 1989, vol. 111, pp. 314-321.
Stille, "The Palladium-Catalyzed Cross-Coupling Reactions of Organotin Reagents with Organic Electrophiles," *Angew. Chem. Int. Ed. Engl.*, 1986, vol. 25, pp. 508-524.
Sonar et al., "A Low-Bandgap Diketopyrrolopyrrole-Benzothiadiazole-Based Copolymer for High-Mobility Ambipolar Organic Thin-Film Transistors," *Advanced Materials*, 2010, vol. 22, pp. 5409-5413.

(Continued)

*Primary Examiner* — Shane Fang
(74) *Attorney, Agent, or Firm* — Harness, Dickey & Pierce, P.L.C.

(57) ABSTRACT

An organic semiconductor compound may include a structural unit represented by the aforementioned Chemical Formula 1 and an organic thin film and an electronic device may include the organic semiconductor compound.

8 Claims, 6 Drawing Sheets

(56) References Cited

OTHER PUBLICATIONS

Cheng et al., "Synthesis of Conjugated Polymers for Organic Solar Cell Applications," *Chemical Reviews*, 2009, vol. 109, pp. 5868-5923.

Qian et al, "Band Gap Tunable, Donor-Acceptor—Donor Charge-Transfer Heteroquinoid-Based Chromophores: Near Infrared Photoluminescence and Electroluminescence," *Chem. Mater.*, 2008, vol. 20, pp. 6208-6216.

Facchetti, "π-Conjugated Polymers for Organic Electronics and Photovoltaic Cell Applications," *Chem. Mater.*, 2011, vol. 23, pp. 733-758.

Bundgaard, "Low Band Gap Polymers for Organic Photovoltaics," *Ph.D. Dissertation*, Risø National Laboratory Technical University of Denmark and Roskilde University Centre. 2007.

ORGANIC SEMICONDUCTOR COMPOUND, ORGANIC THIN FILM INCLUDING THE ORGANIC SEMICONDUCTOR COMPOUND AND ELECTRONIC DEVICE INCLUDING THE ORGANIC THIN FILM, AND METHOD OF MANUFACTURING THE ORGANIC THIN FILM

CROSS-REFERENCE TO RELATED APPLICATION

This application claims priority under 37 U.S.C. §119 to Korean Patent Application No. 10-2011-0123875 filed in the Korean Intellectual Property Office on Nov. 24, 2011, the entire contents of which are incorporated herein by reference.

BACKGROUND

1. Field

Example embodiments relates to an organic semiconductor compound, an organic thin film, and an electronic device including the same.

2. Description of the Related Art

Progressing to an information-oriented society requires developing a new image display device that addresses the drawbacks of the conventional cathode ray tube (CRT) (including a relatively heavy weight and/or a relatively large volume). Several flat panel displays (e.g., a liquid crystal display (LCD), an organic light emitting diode (OLED) display, a plasma display panel (PDP), a surface-conduction electron-emitter display (SED) and similar devices) are drawing attention.

A thin film transistor (TFT) including a semiconductor layer of amorphous silicon is widely used for a switching device of the flat panel displays.

The amorphous silicon thin film transistor is widely used because the amorphous silicon thin film transistor exhibits uniformity and increased electrical characteristics in a doping state, while retaining insulating characteristics in a non-doping state.

However, in order to deposit the conventional amorphous silicon thin film transistor on a substrate, there are limits in carrying out the process at a substantially high temperature of about 300° C. Applying the conventional amorphous silicon thin film transistor to a polymer substrate used to form a flexible display may be difficult. In order to solve the problems, an organic thin film transistor (OTFT) using an organic semiconductor material has been suggested.

The organic thin film transistor includes a substrate, a gate electrode, an insulation layer, a source electrode, a drain electrode, and a channel region. The organic thin film transistor may be classified as a bottom contact (BC) type in which a channel region is formed on the source electrode and the drain electrode or a top contact (TC) type of which a metal electrode is formed on the channel region due to mask deposition.

A low molecular or oligomer organic semiconductor material filled in the channel region of the organic thin film transistor (OTFT) may include merocyanine, phthalocyanine, perylene, pentacene, $C_{60}$, a thiophene oligomer, and similar compounds. The low molecular, or oligomer, organic semiconductor material may be a thin film formed on the channel region according to a vacuum process.

Organic semiconductor compound materials have workability in that relatively large-area processing is capable using a solution method, e.g., printing techniques, at lower costs.

SUMMARY

Example embodiments provide an organic semiconductor compound having a relatively low bandgap, and increased charge mobility, and being capable of being applied to a solution process. Example embodiments also provide an organic thin film including the organic semiconductor compound. Example embodiments also provide an electronic device including the organic thin film as a carrier transport layer. Example embodiments also provide a method of manufacturing an organic thin film including the organic semiconductor compound.

According to example embodiments, an organic semiconductor compound may include a structural unit represented by the following Chemical Formula 1.

[Chemical Formula 1]

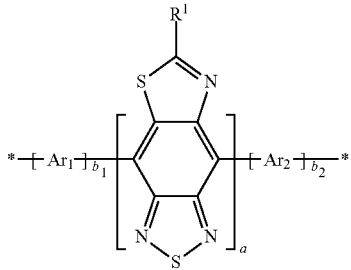

In Chemical Formula 1, $R^1$ is selected from hydrogen, a halogen (one of —F, —Cl, —Br, and —I), a substituted or unsubstituted linear or branched $C_1$ to $C_{30}$ alkyl group, a substituted or unsubstituted linear or branched $C_2$ to $C_{30}$ alkenyl group, a substituted or unsubstituted linear or branched $C_2$ to $C_{30}$ alkynyl group, a substituted or unsubstituted $C_7$ to $C_{30}$ arylalkyl group, a substituted or unsubstituted $C_6$ to $C_{30}$ aryl group, a substituted or unsubstituted $C_1$ to $C_{30}$ alkoxy group, a substituted or unsubstituted $C_6$ to $C_{30}$ aryloxy group (—$OR^{11}$, wherein $R^{11}$ is a substituted or unsubstituted $C_6$ to $C_{30}$ aryl group), a substituted or unsubstituted $C_4$ to $C_{30}$ cycloalkyl group, a substituted or unsubstituted $C_4$ to $C_{30}$ cycloan alkyloxy group (—$OR^{12}$, wherein $R^{12}$ is a substituted or unsubstituted $C_4$ to $C_{30}$ cycloalkyl group), a substituted or unsubstituted $C_2$ to $C_{30}$ heteroaryl group, an acyl group (—$C(=O)R^{13}$, wherein $R^{13}$ is a substituted or unsubstituted $C_1$ to $C_{30}$ alkyl group), a sulfonyl group (—$S(=O)R^{14}$, wherein $R^{14}$ is a substituted or unsubstituted $C_1$ to $C_{30}$ alkyl group), and a carbamate group (—$NH_2COOR^{15}$, wherein $R^{15}$ is a substituted or unsubstituted $C_1$ to $C_{30}$ alkyl group), each of —$Ar_1$— and —$Ar_2$— are independently selected from a substituted or unsubstituted $C_4$ to $C_{20}$ aromatic ring, a substituted or unsubstituted $C_4$ to $C_{14}$ heteroaromatic ring, and a substituted or unsubstituted $C_6$ to $C_{30}$ condensed polycyclic group including a heteroaromatic ring, provided that —$Ar_1$— and —$Ar_2$— are not a thiazolo[4,5-g]-benzo-2',1', 3'-thiadiazole structural unit, and a, $b_1$, and $b_2$ represent a mole ratio of each structural unit, a ranges from about 1 mol % to about 99 mol %, and $b_1+b_2$ ranges from about 1 mol % to about 99 mol % based on 100 mol % of a, $b_1$, and $b_2$.

The —$Ar_1$— and —$Ar_2$— structural units may be one of the structural units represented by the following Chemical Formula 2.

[Chemical Formula 2]
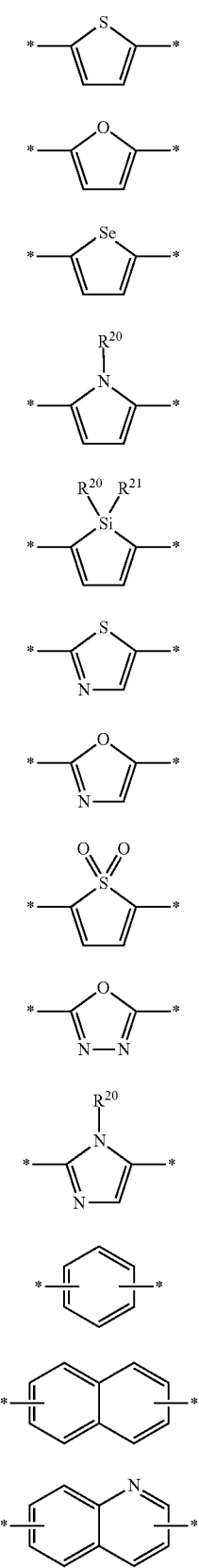
(1)
(2)
(3)
(4)
(5)
(6)
(7)
(8)
(9)
(10)
(11)
(12)
(13)
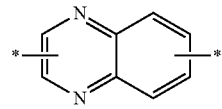
(14)
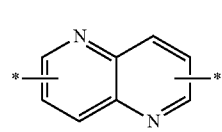
(15)
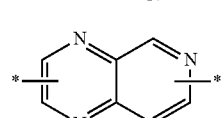
(16)
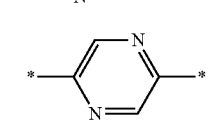
(17)
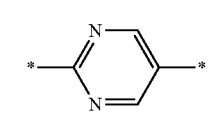
(18)
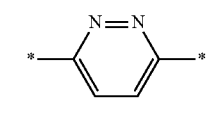
(19)
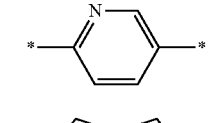
(20)
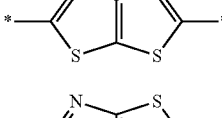
(21)
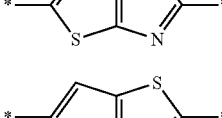
(22)
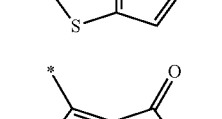
(23)
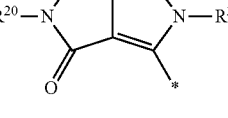
(24)
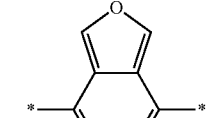
(25)
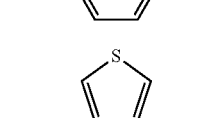
(26)
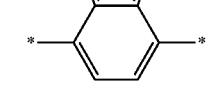

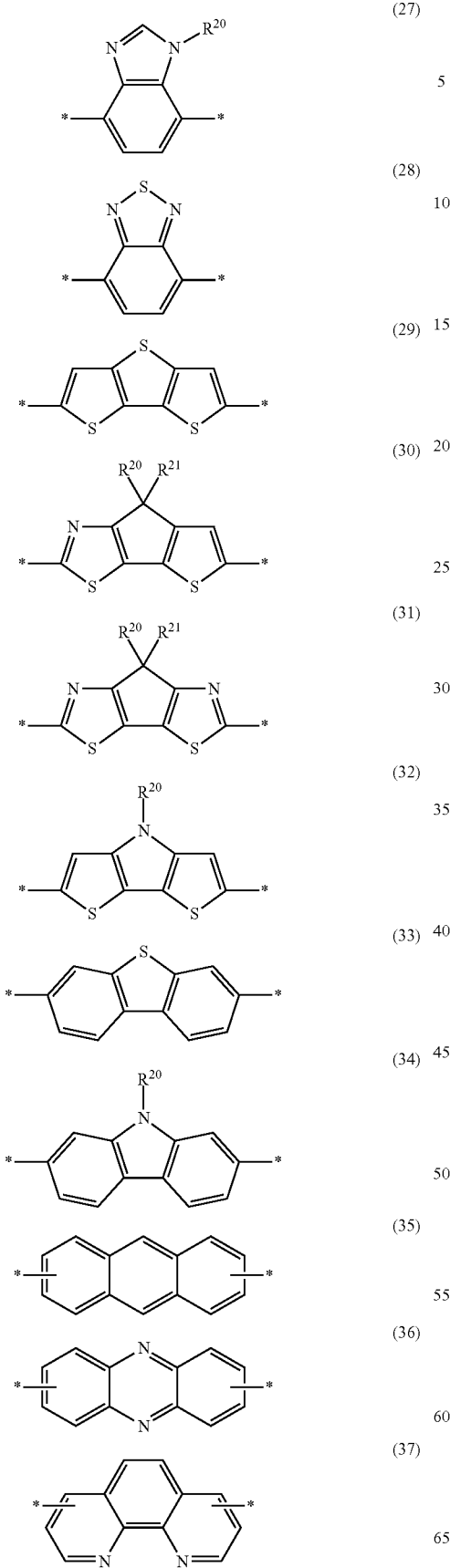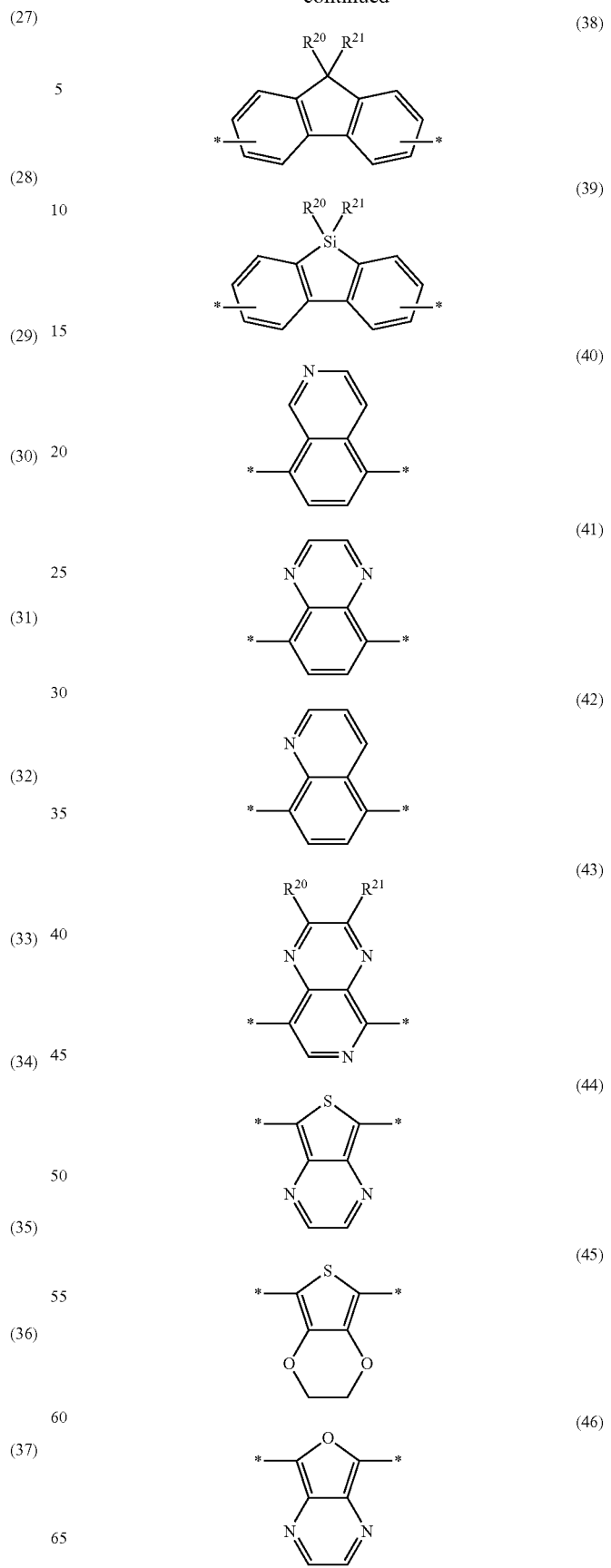

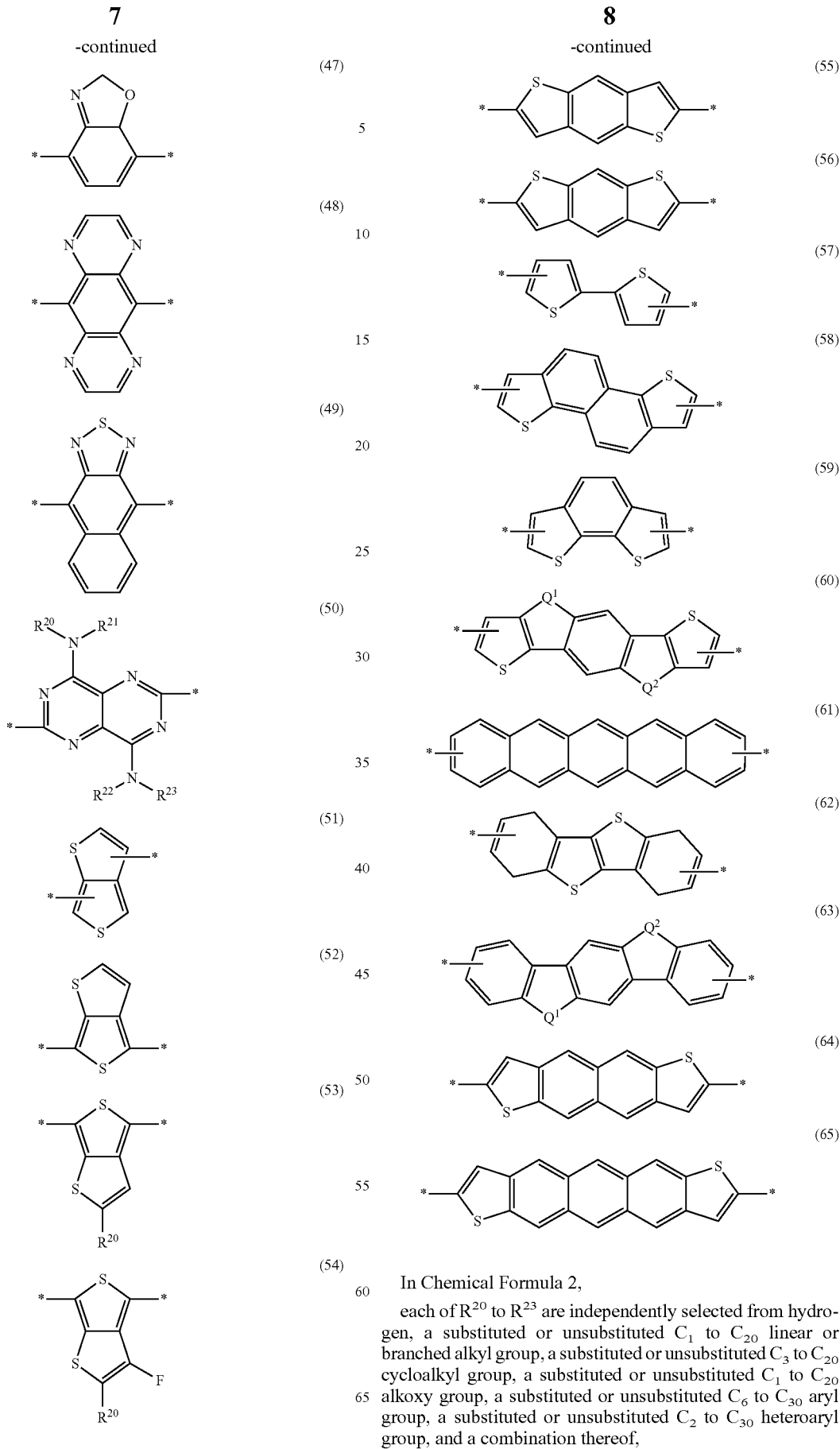

In Chemical Formula 2, each of $R^{20}$ to $R^{23}$ are independently selected from hydrogen, a substituted or unsubstituted $C_1$ to $C_{20}$ linear or branched alkyl group, a substituted or unsubstituted $C_3$ to $C_{20}$ cycloalkyl group, a substituted or unsubstituted $C_1$ to $C_{20}$ alkoxy group, a substituted or unsubstituted $C_6$ to $C_{30}$ aryl group, a substituted or unsubstituted $C_2$ to $C_{30}$ heteroaryl group, and a combination thereof, each of $Q^1$ and $Q^2$ are independently selected from S, $CR^{24}R^{25}$, $NR^{26}$, and $SiR^{27}R^{28}$, wherein $R^{24}$ to $R^{28}$ are each independently selected from hydrogen, a substituted or unsubstituted $C_1$ to $C_{15}$ linear or branched alkyl group, a substituted or unsubstituted $C_3$ to $C_{15}$ cycloalkyl group, a substituted or unsubstituted $C_1$ to $C_{15}$ alkoxy group, a substituted or unsubstituted $C_6$ to $C_{15}$ aryl group, a substituted or unsubstituted $C_2$ to $C_{15}$ heteroaryl group, and a combination thereof.

A hydrogen atom of —CH— or —CH$_2$— positioned in the aromatic ring or heteroaromatic ring of the above Chemical Formula 2 may be optionally substituted with one selected from a fluoro group, a $C_1$ to $C_{10}$ fluoroalkyl group, a $C_1$ to $C_{20}$ linear or branched alkyl group, a $C_3$ to $C_{20}$ cycloalkyl group, a $C_1$ to $C_{20}$ alkoxy group, a substituted or unsubstituted $C_6$ to $C_{30}$ aryl group, and a substituted or unsubstituted $C_2$ to $C_{30}$ heteroaryl group.

The —Ar$_1$— and —Ar$_2$— structural unit may be each independently a structural unit represented by the following Chemical Formula 3 including a substituted or unsubstituted thiophene structural unit.

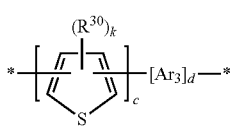

[Chemical Formula 3]

In Chemical Formula 3, $R^{30}$ is one of hydrogen, a substituted or unsubstituted $C_4$ to $C_{20}$ aromatic ring, a substituted or unsubstituted $C_1$ to $C_{20}$ linear or branched alkyl group, a substituted or unsubstituted $C_3$ to $C_{20}$ cycloalkyl group, a substituted or unsubstituted $C_1$ to $C_{20}$ alkoxy group, a substituted or unsubstituted $C_6$ to $C_{30}$ aryl group, a substituted or unsubstituted $C_2$ to $C_{30}$ heteroaryl group, and a combination thereof, or at least one CH$_2$ group of the foregoing groups is substituted with —O—, —S—, —S(=O)$_2$—, —C(=O)—, —OC(=O)—, —C(=O)O—, —R$^{31}$C=CR$^{32}$—, —C≡C— and —SiR$^{33}$R$^{34}$— (wherein, each of $R^{31}$ to $R^{34}$ are independently one of hydrogen, a substituted or unsubstituted $C_1$ to $C_{20}$ linear or branched alkyl group, a substituted or unsubstituted $C_3$ to $C_{20}$ cycloalkyl group, a substituted or unsubstituted $C_1$ to $C_{20}$ alkoxy group, a substituted or unsubstituted $C_6$ to $C_{30}$ aryl group, and a substituted or unsubstituted $C_2$ to $C_{30}$ heteroaryl group), k is an integer of 1 or 2, —Ar$_3$— is one of a substituted or unsubstituted $C_4$ to $C_{20}$ aromatic ring, a substituted or unsubstituted $C_4$ to $C_{14}$ heteroaromatic ring, and a substituted or unsubstituted $C_6$ to $C_{30}$ condensed polycyclic group including a heteroaromatic ring, provided that —Ar$_3$— is not a thiazolo[4,5-g]-benzo-2',1',3'-thiadiazole structural unit, and c and d represent a mole ratio of each structural unit, c ranges from about 1 mol % to about 99 mol %, and d ranges from 1 to from 99 mol % based on 100 mol % of c and d.

The —Ar$_3$— of the Chemical Formula 3 may be one of the above structural units represented by Chemical Formula 2.

The organic semiconductor compound may include one of terminal functional groups represented by the following Chemical Formulas 4 to 7.

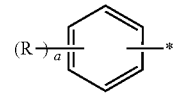

[Chemical Formula 4]

In Chemical Formula 4,
R is a fluoro group or a $C_1$ to $C_{20}$ perfluoroalkyl group, and a is an integer ranging from 1 to 5.

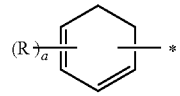

[Chemical Formula 5]

In Chemical Formula 5,
R is a fluoro group or a $C_1$ to $C_{20}$ perfluoroalkyl group, and a is an integer ranging from 1 to 6.

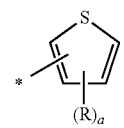

[Chemical Formula 6]

In Chemical Formula 6,
R is a fluoro group or a $C_1$ to $C_{20}$ perfluoroalkyl group, and a is an integer ranging from 1 to 3.

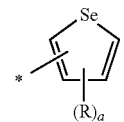

[Chemical Formula 7]

In Chemical Formula 7,
R is a fluoro group or a $C_1$ to $C_{20}$ perfluoroalkyl group, and a is an integer ranging from 1 to 3.

According to example embodiments, an organic thin film and an electronic device may include the organic semiconductor compound.

According to example embodiments, a method of manufacturing an organic thin film may include depositing an organic semiconductor compound on a substrate or dissolving the organic semiconductor compounds in an organic solvent and then coating the same at room temperature, wherein the organic semiconductor compound may be represented by the aforementioned Chemical Formula 1.

BRIEF DESCRIPTION OF THE DRAWINGS

Example embodiments will be more clearly understood from the following brief description taken in conjunction with the accompanying drawings.

FIG. 1 is a schematic cross-sectional view of a transistor according to example embodiments.

FIG. 2 is a schematic cross-sectional view of a transistor according to example embodiments.

FIG. 3 shows 1H NMR spectrum of the polymer according to Example 1.

FIG. 4 shows a differential scanning calorimetry (DSC) analysis result of the polymer according to Example 1.

Figure 1:
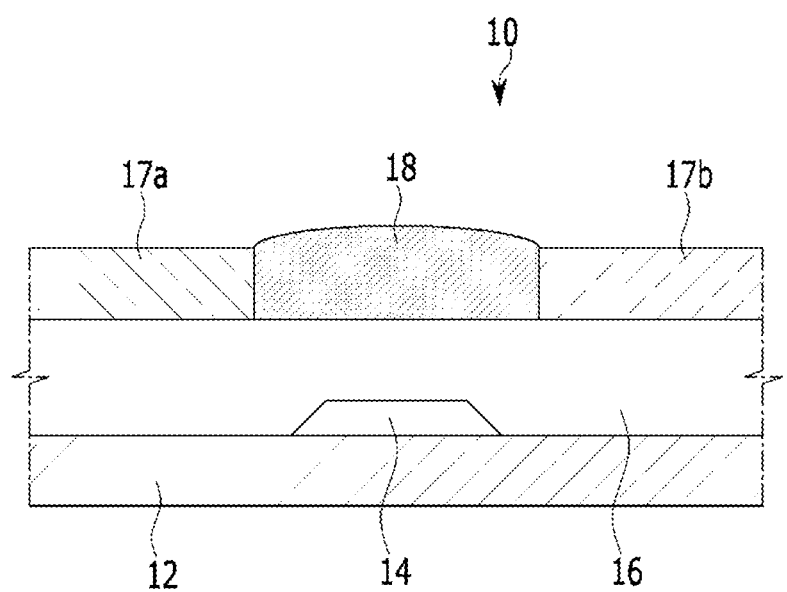
FIGS. 1-4 represent non-limiting, example embodiments as described herein.

It is to be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and is not to be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments will now be described more fully with reference to the accompanying drawings, in which example embodiments are shown. Example embodiments may, however, be embodied in many different forms and is not to be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers are to be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections are not to be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments are not to be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, is to be interpreted as having a meaning that is consistent with their meaning in the context of the relevant art and will not be interpreted in an idealized or overly formal sense unless expressly so defined herein.

As used herein, the term "combination thereof" refers to a mixture, a stacked structure, a composite, and/or an alloy.

As used herein, when a definition is not otherwise provided, the term "hetero" may refer to one including 1 to 4 heteroatoms selected from N, O, S, Se, Si, and P. The total number of ring members may be 3 to 10. If multiple rings are present, each ring is independently aromatic, saturated, or partially unsaturated, and multiple rings, if present, may be fused, pendant, spirocyclic, or a combination thereof. The term "heterocycloalkyl group" may be at least one non-aromatic ring including a heteroatom, and the term "heteroaryl group" may be at least one aromatic ring including a heteroatom. Non-aromatic and/or carbocyclic rings may also be present in a heteroaryl group, provided that at least one ring is both aromatic and contains a ring member that is a heteroatom.

As used herein, when a definition is not otherwise provided, the term "alkyl group" may be a linear or branched, saturated, monovalent hydrocarbon group (e.g., a methyl group, an ethyl group, a propyl group, an isobutyl group, a sec-butyl group, a tert-butyl group, a pentyl group, an isoamyl group, and a hexyl group).

The term "alkenyl group" may refer to a linear or branched saturated monovalent hydrocarbon group including at least one carbon-carbon double bond (e.g., an ethenyl group).

The term "alkynyl group" may refer to a linear or branched saturated monovalent hydrocarbon group including at least one carbon-carbon (e.g., ethynyl group).

The term "alkoxy group" may refer to an alkyl group that is linked via an oxygen, e.g., a methoxy group, an ethoxy group, and a sec-butyloxy group.

The term "aryl group" may refer to a monovalent functional group formed by the removal of one hydrogen atom from one or more rings of an arene, e.g., phenyl or naphthyl. The arene may refer to a hydrocarbon having an aromatic ring, and includes monocyclic and polycyclic hydrocarbons wherein the additional ring(s) of the polycyclic hydrocarbon may be aromatic or nonaromatic.

The term "aryloxy group" may refer to an aryl group that is linked via an oxygen, and the aryl group is the same as described above.

The "arylalkyl group" may refer to an aryl group where at least one hydrogen is substituted with a lower alkylene, e.g., methylene, ethylene, and propylene. For example, the "arylalkyl group" may be a benzyl group or a phenylethyl group.

The term "cycloalkyl group" may refer to a monovalent functional group having one or more saturated rings in which all ring members are carbon, e.g., a cyclopentyl group and a cyclohexyl group.

The term "cycloalkenyl group" may refer to a monovalent functional group including at least one ring having a carbon-carbon double bond, wherein all ring members are carbon, e.g., a cyclopentenyl group or a cyclohexenyl group.

As used herein, when a definition is not otherwise provided, "aromatic ring" refers to a functional group in which all atoms in the cyclic functional group have a p-orbital, wherein these p-orbitals are conjugated. For example, the aromatic ring may be a $C_6$ to $C_{20}$ aryl group.

As used herein, when a definition is not otherwise provided, the term "heteroaromatic ring" refers to a functional group including 1 to 4 heteroatoms selected from N, O, and S in a ring in which all atoms in the cyclic functional group have a p-orbital, wherein the p-orbital is conjugated. For example, the heteroaromatic ring may be one of a $C_2$ to $C_{30}$ heteroaryl group, a $C_3$ to $C_{30}$ heterocycloalkenyl group, and a $C_3$ to $C_{30}$ heterocycloalkynyl group. The term "condensed polycyclic group" may refer to a fused ring including the foregoing heteroaromatic ring linked to at least one ring selected from a $C_3$ to $C_{30}$ cycloalkyl group, a $C_3$ to $C_{30}$ cycloalkenyl group, a $C_2$ to $C_{30}$ heterocycloalkyl group, a $C_2$ to $C_{30}$ heteroaryl group, and a $C_3$ to $C_{30}$ heterocycloalkenyl group.

As used herein, when a definition is not otherwise provided, the term "substituted" may mean that a functional group or a compound is substituted with at least one substituent selected independently from a halogen (one of —F, —Cl, —Br, and —I), a $C_1$ to $C_{30}$ linear or branched alkyl group, for example, a $C_1$ to $C_{10}$ linear or branched alkyl group, a $C_2$ to $C_{30}$ linear or branched alkenyl group, for example a $C_2$ to $C_{10}$ linear or branched alkenyl group, a $C_2$ to $C_{30}$ linear or branched alkynyl group, for example a $C_2$ to $C_{10}$ linear or branched alkynyl group, $C_6$ to $C_{30}$ aryl group, for example a $C_6$ to $C_{12}$ aryl group, a $C_2$ to $C_{30}$ heteroaryl group, for example a $C_2$ to $C_{12}$ heteroaryl group, a $C_3$ to $C_{30}$ cycloalkyl group, a $C_1$ to $C_{20}$ fluoroalkyl group, a $C_1$ to $C_{20}$ perfluoroalkyl group ($C_nF_{2n+1}$, n is an integer of 1 to 20), a $C_1$ to $C_{30}$ linear or branched alkoxy group, a $C_3$ to $C_{30}$ cycloalkoxy group, a $C_2$ to $C_{30}$ linear or branched alkoxyalkyl group, a $C_4$ to $C_{30}$ cycloalkoxyalkyl group, a cyano group, an amino group (—NRR', wherein R and R' are independently hydrogen or a $C_1$ to $C_{10}$ alkyl group), an amidino group (—C(=NH)NH$_2$), a nitro group (—NO$_2$), an amide group (—C(=O)N(H)R, wherein R is hydrogen or a $C_1$ to $C_{10}$ alkyl group), an aldehyde group (—C(=O)H), a hydroxy group (—OH), a sulfonyl group (—S(=O)$_2$R, wherein R is independently hydrogen or a $C_1$ to $C_{10}$ alkyl group), and a carbamate group (—NH$_2$COOR, wherein R is a $C_1$ to $C_{10}$ alkyl group), instead of hydrogen, provided that the substituted atom's normal valence is not exceeded.

According to example embodiments, an organic semiconductor compound may include a structural unit represented by the following Chemical Formula 1.

[Chemical Formula 1]

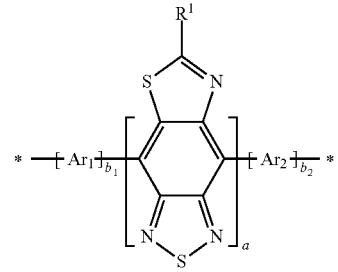

In Chemical Formula 1, $R^1$ is one of hydrogen, a halogen (one of —F, —Cl, —Br, and —I), a substituted or unsubstituted linear or branched $C_1$ to $C_{30}$ alkyl group, a substituted or unsubstituted linear or branched $C_2$ to $C_{30}$ alkenyl group, a substituted or unsubstituted linear or branched $C_2$ to $C_{30}$ alkynyl group, a substituted or unsubstituted $C_7$ to $C_{30}$ arylalkyl group, a substituted or unsubstituted $C_6$ to $C_{30}$ aryl group, a substituted or unsubstituted $C_1$ to $C_{30}$ alkoxy group, a substituted or unsubstituted $C_6$ to $C_{30}$ aryloxy group (—OR$^{11}$, wherein R$^{11}$ is a substituted or unsubstituted $C_6$ to $C_{30}$ aryl group), a substituted or unsubstituted $C_4$ to $C_{30}$ cycloalkyl group, a substituted or unsubstituted $C_4$ to $C_{30}$ cycloanalkyloxy group (—OR$^{12}$, wherein R$^{12}$ is a substituted or unsubstituted $C_4$ to $C_{30}$ cycloalkyl group), a substituted or unsubstituted $C_2$ to $C_{30}$ heteroaryl group, an acyl group (—C(=O)R$^{13}$, wherein R$^{13}$ is a substituted or unsubstituted $C_1$ to $C_{30}$ alkyl group), a sulfonyl group (—S(=O)R$^{14}$, wherein R$^{14}$ is a substituted or unsubstituted $C_1$ to $C_{30}$ alkyl group) and a carbamate group (—NH$_2$COOR$^{15}$, wherein R$^{15}$ is a substituted or unsubstituted $C_1$ to $C_{30}$ alkyl group), each of —Ar$_1$— and —Ar$_2$— are independently one of a substituted or unsubstituted $C_4$ to $C_{20}$ aromatic ring, a substituted or unsubstituted $C_4$ to $C_{14}$ heteroaromatic ring and a substituted or unsubstituted $C_6$ to $C_{30}$ condensed polycyclic group including a heteroaromatic ring, provided that —Ar$_1$— and —Ar$_2$— are not thiazolo[4,5-g]-benzo-2',1',3'-thiadiazole structural unit, and a, $b_1$, and $b_2$ represent a mole ratio of each structural unit, a ranges from about 1 mol % to about 99 mol %, and $b_1+b_2$ ranges from about 1 mol % to about 99 mol % based on 100 mol % of a, $b_1$, and $b_2$. $b_1$ ranges from about 0 mol % to about 100 mol %, for example, about 20 mol % to about 80 mol %, and $b_2$ ranges from about 0 mol % to about 100 mol %, for example, about 20 mol % to about 80 mol % based on 100 mol % of $b_1$ and $b_2$.

The —Ar$_1$— and —Ar$_2$— structural units may be one of the structural units represented by the following Chemical Formula 2.
[Chemical Formula 2]
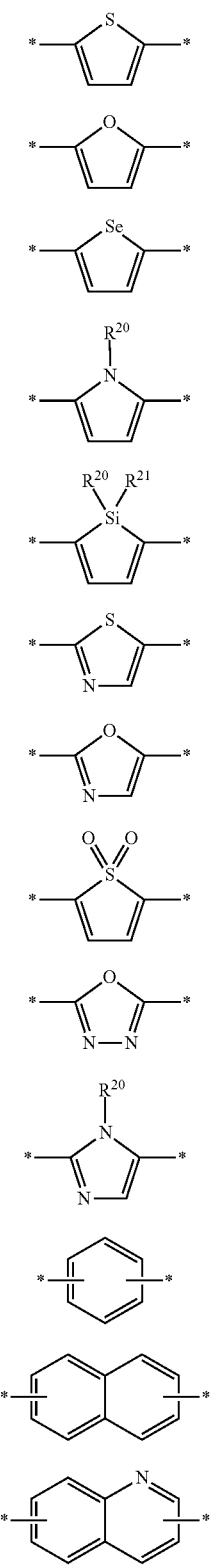
(1)
(2)
(3)
(4)
(5)
(6)
(7)
(8)
(9)
(10)
(11)
(12)
(13)
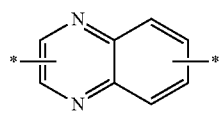
(14)
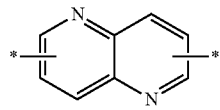
(15)
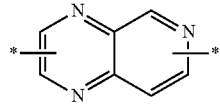
(16)
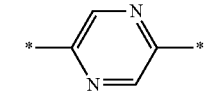
(17)
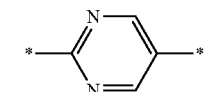
(18)
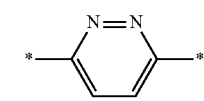
(19)
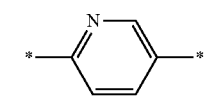
(20)
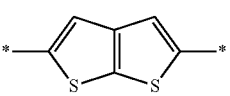
(21)
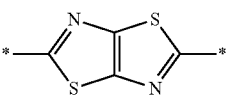
(22)
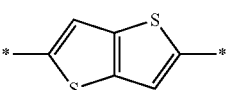
(23)
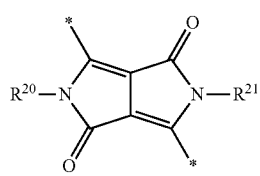
(24)
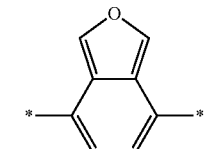
(25)
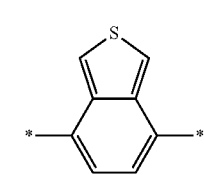
(26)

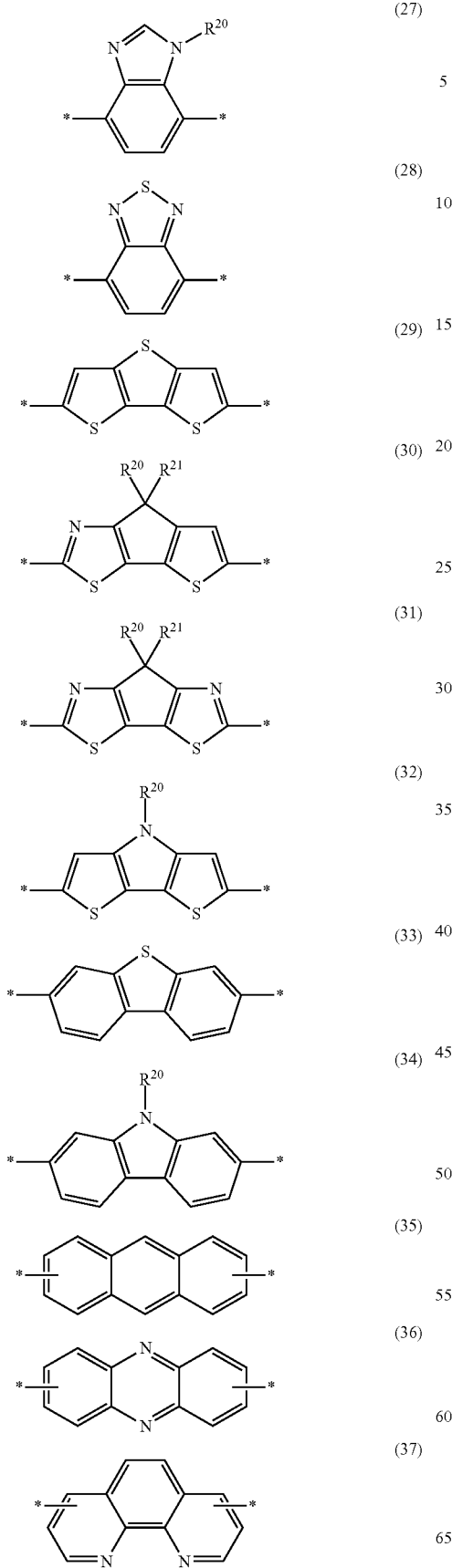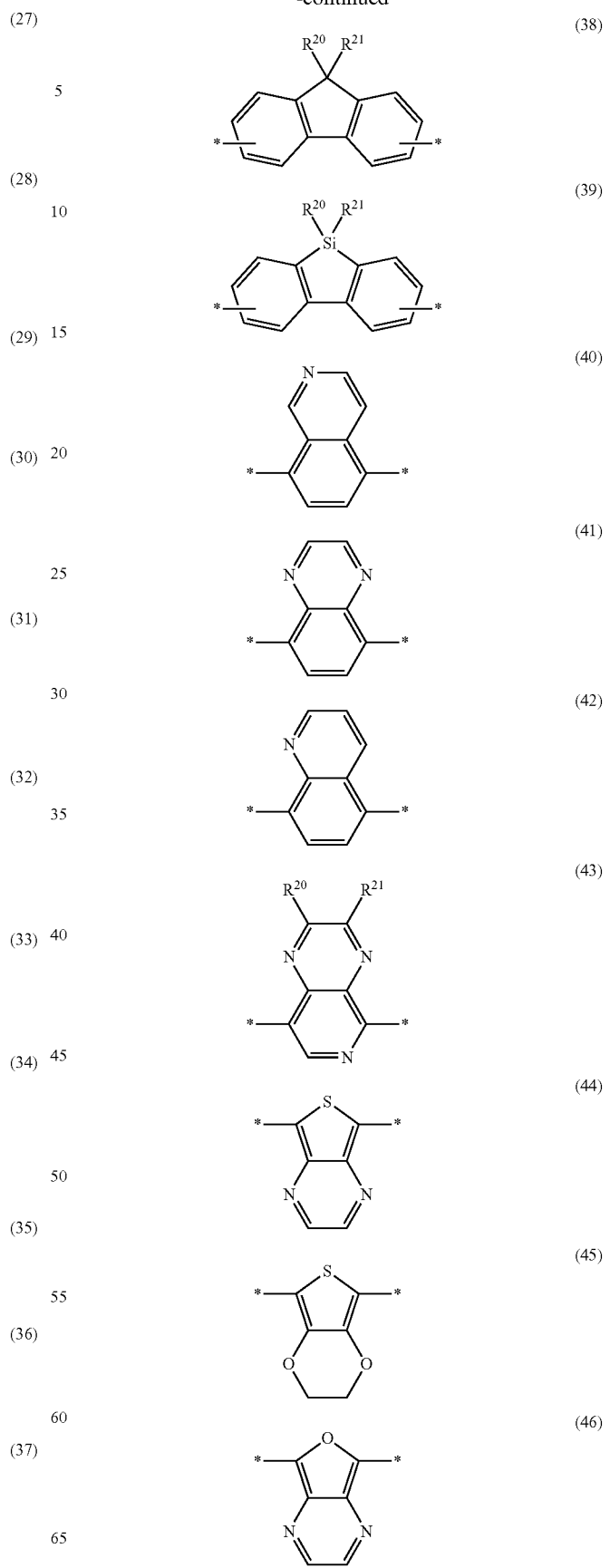

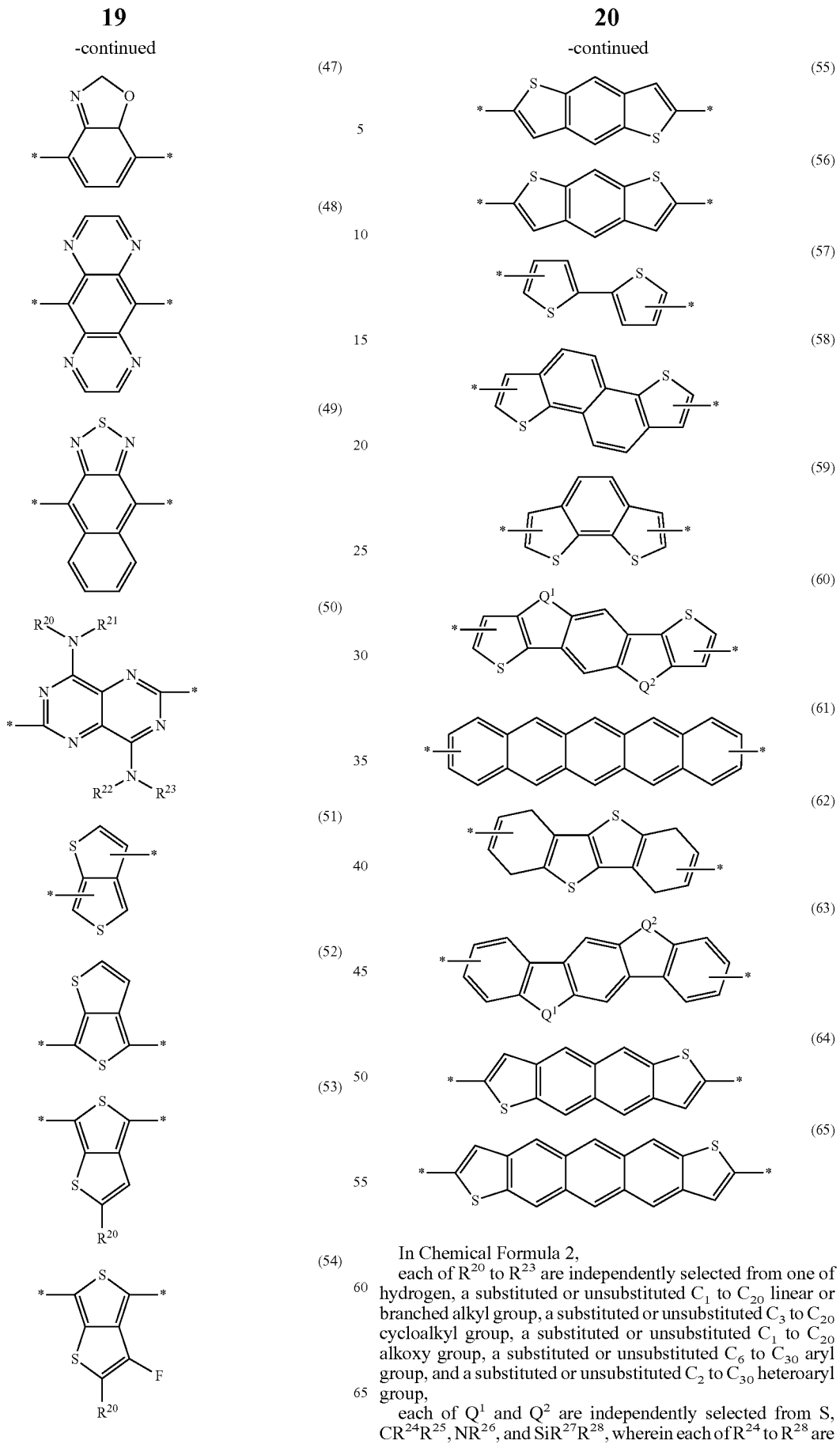

In Chemical Formula 2,
each of $R^{20}$ to $R^{23}$ are independently selected from one of hydrogen, a substituted or unsubstituted $C_1$ to $C_{20}$ linear or branched alkyl group, a substituted or unsubstituted $C_3$ to $C_{20}$ cycloalkyl group, a substituted or unsubstituted $C_1$ to $C_{20}$ alkoxy group, a substituted or unsubstituted $C_6$ to $C_{30}$ aryl group, and a substituted or unsubstituted $C_2$ to $C_{30}$ heteroaryl group, each of $Q^1$ and $Q^2$ are independently selected from S, $CR^{24}R^{25}$, $NR^{26}$, and $SiR^{27}R^{28}$, wherein each of $R^{24}$ to $R^{28}$ are independently selected from hydrogen, a substituted or unsubstituted $C_1$ to $C_{15}$ linear or branched alkyl group, a substituted or unsubstituted $C_3$ to $C_{15}$ cycloalkyl group, a substituted or unsubstituted $C_1$ to $C_{15}$ alkoxy group, a substituted or unsubstituted $C_6$ to $C_{15}$ aryl group, a substituted or unsubstituted $C_2$ to $C_{15}$ heteroaryl group, and a combination thereof.

A hydrogen atom of —CH— or —CH$_2$— positioned in the aromatic ring or heteroaromatic ring of the above Chemical Formula 2 may be optionally substituted with one selected from a fluoro group, a $C_1$ to $C_{10}$ fluoroalkyl group, a $C_1$ to $C_{20}$ linear or branched alkyl group, a $C_3$ to $C_{20}$ cycloalkyl group, a $C_1$ to $C_{20}$ alkoxy group, a substituted or unsubstituted $C_6$ to $C_{30}$ aryl group, and a substituted or unsubstituted $C_2$ to $C_{30}$ heteroaryl group.

The organic semiconductor compound including the structural unit represented by Chemical Formula 1 may include a first structural unit of thiazolo[4,5-g]-benzo-2',1',3'-thiadiazole and a second structural unit of —Ar$_1$—, and a third structural unit of —Ar$_2$—. The first structural unit, the second structural unit, and the third structural unit may be arranged as a block unit, alternately arranged, or randomly arranged.

The organic semiconductor compound including the structural unit represented by the above Chemical Formula 1 has desirable coplanarity so as to improve charge mobility and also decrease interrupting current by controlling the energy level. Since the thiazolo[4,5-g]-benzo-2',1',3'-thiadiazole first structural unit has an n-type characteristic, the bandgap or HOMO energy level of the organic semiconductor compound may be controlled according to the amount of the first structural unit.

Also, the solubility of the organic semiconductor compound for an organic solvent may be improved by introducing a $C_8$ to $C_{30}$ long aliphatic chain (e.g., a substituted or unsubstituted $C_8$ to $C_{30}$ alkyl group or a substituted or unsubstituted $C_8$ to $C_{30}$ alkenyl group) as $R^1$ of the thiazolo[4,5-g]-benzo-2',1',3'-thiadiazole first structural unit in the above Chemical Formula 1. The improved solubility makes it easier not only to perform a coating through a solution process that is performed at room temperature (ranging from about 23° C. to about 25° C.) but also to realize a relatively large area thin film that is effective in terms of processibility and workability.

The —Ar$_1$— and —Ar$_2$— structural unit are each independently a structural unit represented by the following Chemical Formula 3 including a substituted or unsubstituted thiophene structural unit.

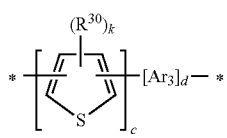

[Chemical Formula 3]

In Chemical Formula 3, $R^{30}$ is one of hydrogen, a substituted or unsubstituted $C_4$ to $C_{20}$ aromatic ring, a substituted or unsubstituted $C_1$ to $C_{20}$ linear or branched alkyl group, a substituted or unsubstituted $C_3$ to $C_{20}$ cycloalkyl group, a substituted or unsubstituted $C_1$ to $C_{20}$ alkoxy group, a substituted or unsubstituted $C_6$ to $C_{30}$ aryl group, a substituted or unsubstituted $C_2$ to $C_{30}$ heteroaryl group, and a combination thereof, or optionally at least one CH$_2$ group may be substituted with —O—, —S—, —S(=O)$_2$—, —C(=O)—, —OC(=O)—, —C(=O)O—, —R$^{31}$C=CR$^{32}$—, —C≡C—, or —SiR$^{33}$R$^{34}$— (wherein each of $R^{31}$ to $R^{34}$ are independently one of hydrogen, a substituted or unsubstituted $C_1$ to $C_{20}$ linear or branched alkyl group, a substituted or unsubstituted $C_3$ to $C_{20}$ cycloalkyl group, a substituted or unsubstituted $C_1$ to $C_{20}$ alkoxy group, a substituted or unsubstituted $C_6$ to $C_{30}$ aryl group, and a substituted or unsubstituted $C_2$ to $C_{30}$ heteroaryl group), k is an integer of 1 or 2, —Ar$_3$— is one of a substituted or unsubstituted $C_4$ to $C_{20}$ aromatic ring, a substituted or unsubstituted $C_4$ to $C_{14}$ heteroaromatic ring, and a substituted or unsubstituted $C_6$ to $C_{30}$ condensed polycyclic group including a heteroaromatic ring, provided that —Ar$_3$— is not a thiazolo[4,5-g]-benzo-2',1',3'-thiadiazole structural unit, and c and d represent a mole ratio of each structural unit, c ranges from about 1 mol % to about 99 mol %, and d ranges from 1 to from 99 mol % based on 100 mol % of c and d.

The —Ar$_3$— of the Chemical Formula 3 may be one of the above structural units represented by Chemical Formula 2.

In Chemical Formula 3, a substituted or unsubstituted thiophene structural unit and a —Ar$_3$— structural unit may be arranged as a block unit, alternately arranged, or randomly arranged.

The organic semiconductor compound may include one of terminal functional groups represented by the following Chemical Formulas 4 to 7.

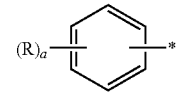

[Chemical Formula 4]

In Chemical Formula 4,

R is one of a fluoro group and a $C_1$ to $C_{20}$ perfluoroalkyl group, and a is an integer ranging from 1 to 5.

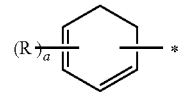

[Chemical Formula 5]

In Chemical Formula 5,

R is one of a fluoro group and a $C_1$ to $C_{20}$ perfluoroalkyl group, and a is an integer ranging from 1 to 6.

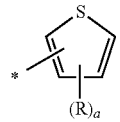

[Chemical Formula 6]

In Chemical Formula 6,

R is one of a fluoro group and a $C_1$ to $C_{20}$ perfluoroalkyl group, and a is an integer ranging from 1 to 3.

[Chemical Formula 7]

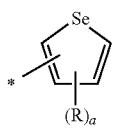

In Chemical Formula 7,

R is one of a fluoro group and a $C_1$ to $C_{20}$ perfluoroalkyl group, and a is an integer ranging from 1 to 3.

The organic semiconductor compound including the structural unit represented by Chemical Formula 1 may be an organic compound including one of the structural units represented by the following Chemical Formula 8 or a combination thereof.

In Chemical Formula 8, $R^1$ is the same as in Chemical Formula 1, and each of $R^2$ to $R^6$ are independently one of hydrogen, a substituted or unsubstituted $C_1$ to $C_{20}$ linear or branched alkyl group, a substituted or unsubstituted $C_3$ to $C_{20}$ cycloalkyl group, a substituted or unsubstituted $C_1$ to $C_{20}$ alkoxy group, a substituted or unsubstituted $C_6$ to $C_{30}$ aryl group, and a substituted or unsubstituted $C_2$ to $C_{30}$ heteroaryl group.

A hydrogen atom of —CH— positioned in the heteroaromatic ring of the above Chemical Formula 8 may be optionally substituted with one selected from a fluoro group, a $C_1$ to $C_{10}$ fluoroalkyl group, a $C_1$ to $C_{20}$ linear or branched alkyl group, a $C_3$ to $C_{20}$ cycloalkyl group, a $C_1$ to $C_{20}$ alkoxy group, a substituted or unsubstituted $C_6$ to $C_{30}$ aryl group, and a substituted or unsubstituted $C_2$ to $C_{30}$ heteroaryl group.

The organic semiconductor compound including the structural unit represented by Chemical Formula 1 may be an

[Chemical Formula 8]

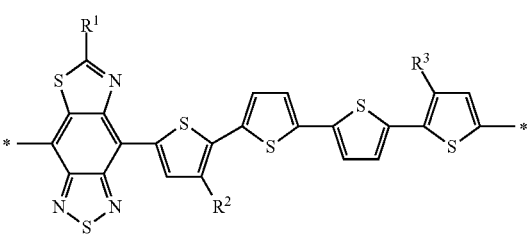

(8-1)

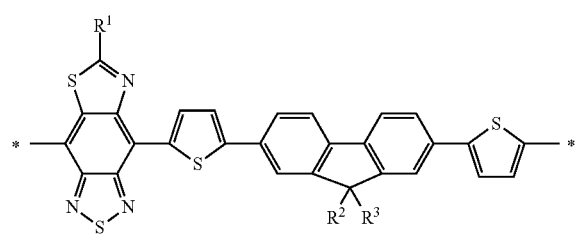

(8-2)

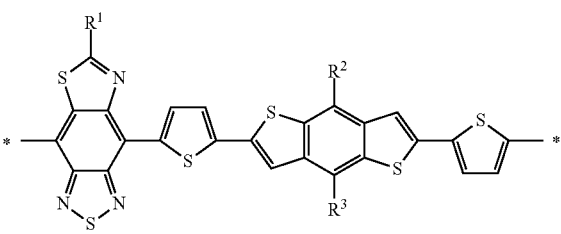

(8-3)

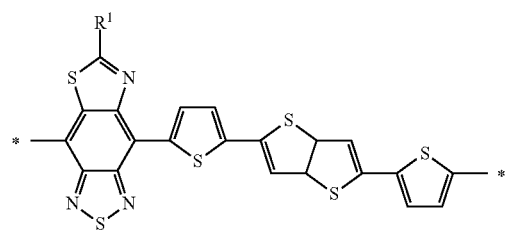

(8-4)

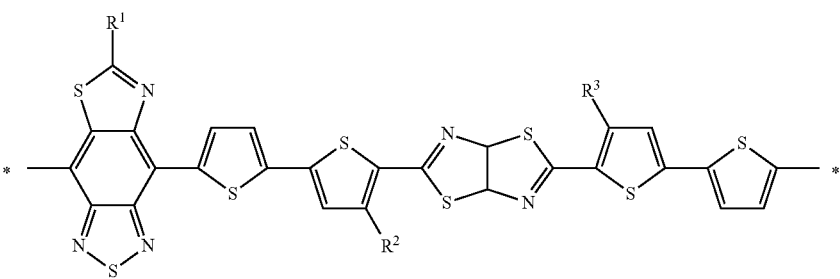

(8-5)

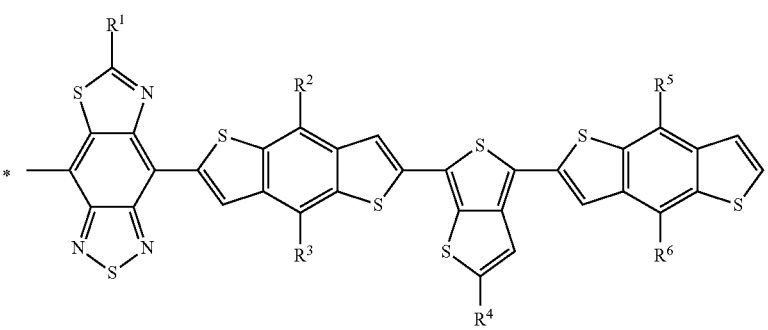

(8-6)

oligomer having a number average molecular weight (Mn) of about 500 to about 10000, or a polymer having a number average molecular weight (Mn) of about 10,000 to about 100,000. When the number average molecular weight of the organic semiconductor compound falls in the range, the solubility for an organic solvent may be more easily controlled and a thin film having desirable characteristics may be provided.

The organic semiconductor compound including the structural unit represented by Chemical Formula 1 may be synthesized.

According to example embodiments, an organic thin film may include the organic semiconductor compound and an electronic device may include the organic thin film.

The organic thin film according to example embodiments may include the organic semiconductor compound, and thereby, may be applied to an organic semiconductor layer for an electronic device, or a carrier transport layer, e.g., by a channel layer. The electronic device including the same may have desirable electrical properties, for example, relatively high charge mobility as well as improved processibility and workability.

The organic thin film may be fabricated by depositing the organic semiconductor compound on a substrate according to a conventional method, or alternatively dissolving the organic semiconductor compounds in an organic solvent and then coating the same at room temperature according to a solution process. If required, heating treatment may be performed after the deposition or coating process to further enhance the densification and uniformity of the thin film.

Particularly, the organic solvent may include at least one kind of conventional organic solvent, for example, at least one kind of an aliphatic hydrocarbon solvent, e.g., hexane or heptane; an aromatic hydrocarbon solvent, for example, toluene, pyridine, quinoline, anisole, mesitylene, or xylene; a ketone-based solvent, for example, methyl isobutyl ketone, 1-methyl-2-pyrrolidinone, cyclohexanone, or acetone; an ether-based solvent, for example, tetrahydrofuran or isopropyl ether; an acetate-based solvent, for example, ethyl acetate, butyl acetate, or propylene glycol methyl ether acetate; an alcohol-based solvent, for example, isopropyl alcohol or butanol; an amide-based solvent, for example, dimethyl acetamide or dimethyl formamide; a silicone-based solvent; and a mixture of solvents. The amount of the organic semiconductor compound dissolved in the organic solvent may be adequately selected and determined by a person of ordinary skill in the art, for example, in a range of about 0.01 wt % to about 50 wt % in the total solvent in the view of solubility and coating property.

The method of providing an organic thin film may include thermal deposition, vacuum deposition, laser deposition, screen printing, printing, imprinting, spin casting, dipping, inkjetting, roll coating, flow coating, drop casting, spray coating, and/or roll printing, but is not limited thereto. The heat treatment may be performed at about 80 to about 250° C. for about 1 minute to about 2 hours, but is not limited thereto.

The thickness of the organic thin film may be adjusted according to the usage and the case considering the kinds of the used compound and solvent by a person of ordinary skill in the art, and may be in a range of about 200 Å to about 10,000 Å.

Examples of electronic devices including the organic thin film as a carrier transport layer may include a transistor, an organic light emitting diode (OLED), a photovoltaic device, a solar cell, a laser device, a memory, and/or a sensor, and the organic thin film may be applied to each device according to a conventional process commonly known in the art.

For example, the transistor may include a gate electrode disposed on a substrate, a source electrode and a drain electrode facing each other and defining a channel region, an insulation layer electrically insulating the source electrode and drain electrode and the gate electrode, and an active layer including the organic semiconductor compound formed in the channel region.

The active layer may be obtained by applying a composition including the organic semiconductor compound to a solution process, e.g., screen printing, printing, spin coating, dipping, and/or ink jetting. When the active layer is formed by the solution process, the process costs may be reduced, and a wider area device may be effectively fabricated.

Figure 2:
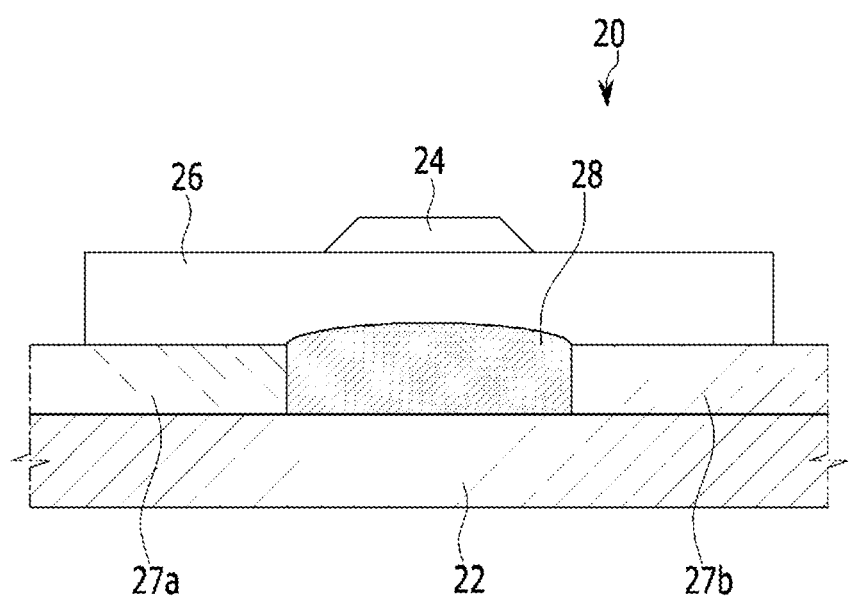

FIGS. 1 and 2 are schematic cross-sectional views showing a transistor according to example embodiments. The transistor according to example embodiments may be a thin film transistor. The thin film transistor may be a thin film having a thickness of several nanometers to several microns.

Referring to FIG. 1, a transistor 10 may include a substrate 12, a gate electrode 14 disposed on the substrate, and an insulation layer 16 covering the gate electrode 14. On the insulation layer 16, a source electrode 17a and a drain electrode 17b defining a channel region may be provided, and an active layer 18 may be provided in the channel region. The active layer 18 may include the organic semiconductor compound.

Referring to FIG. 2, a transistor 20 may include a source electrode 27a and a drain electrode 27b defining a channel region and that are formed on a substrate 22, and an active layer 28 formed on the channel region. The active layer 28 may include the organic semiconductor compound. An insulation layer 26 may be formed to cover the source electrode 27a, the drain electrode 27b, and the active layer 28, and a gate electrode 24 may be formed thereon.

The substrates 12 and 22 may include an inorganic material, an organic material, or a composite of an inorganic material and an organic material. The organic material may include, for example, a plastic, e.g., polyethylene naphthalate (PEN), polyethylene terephthalate (PET), polycarbonate, polyvinyl alcohol, polyacrylate, polyimide, polynorbornene, and polyethersulfone (PES), and the inorganic material may include, for example, glass or metal.

In addition, the gate electrodes 14 and 24, source electrodes 17a and 27a, and drain electrodes 17b and 27b may include a conventional metal, for example, gold (Au), silver (Ag), aluminum (Al), nickel (Ni), or indium tin oxide (ITO), but example embodiments are not limited thereto.

The insulation layers 16 and 26 may include a conventional insulator having a high dielectric constant, for example, a ferroelectric insulator, e.g., $Ba_{0.33}Sr_{0.66}TiO_3$ (BST, barium strontium titanate), $Al_2O_3$, $Ta_2O_5$, $La_2O_5$, $Y_2O_3$, and $TiO_2$, an inorganic insulator, e.g., $PbZr_{0.33}Ti_{0.66}O_3$ (PZT), $Bi_4Ti_3O_{12}$, $BaMgF_4$, $SrBi_2(TaNb)_2O_9$, $Ba(ZrTi)O_3$ (BZT), $BaTiO_3$, $SrTiO_3$, $SiO_2$, $SiN_x$, and AlON, or an organic insulator, e.g., polyimide, benzocyclobutane (BCB), parylene, polyacrylate, polyvinyl alcohol, and polyvinylphenol, but example embodiments are not limited thereto.

Hereinafter, example embodiments are illustrated in more detail with reference to examples. However, the following are example embodiments and are not limiting.

EXAMPLE 1

EXAMPLE 1-1

Synthesis of Monomer

N-(6-chlorobenzo[c][1,2,5]thiadiazol-5-yl)nonanethioamide is synthesized as a monomer for synthesizing an organic semiconductor compound (polymer) as shown in the following Reaction Scheme 1.

[Reaction Scheme 1]

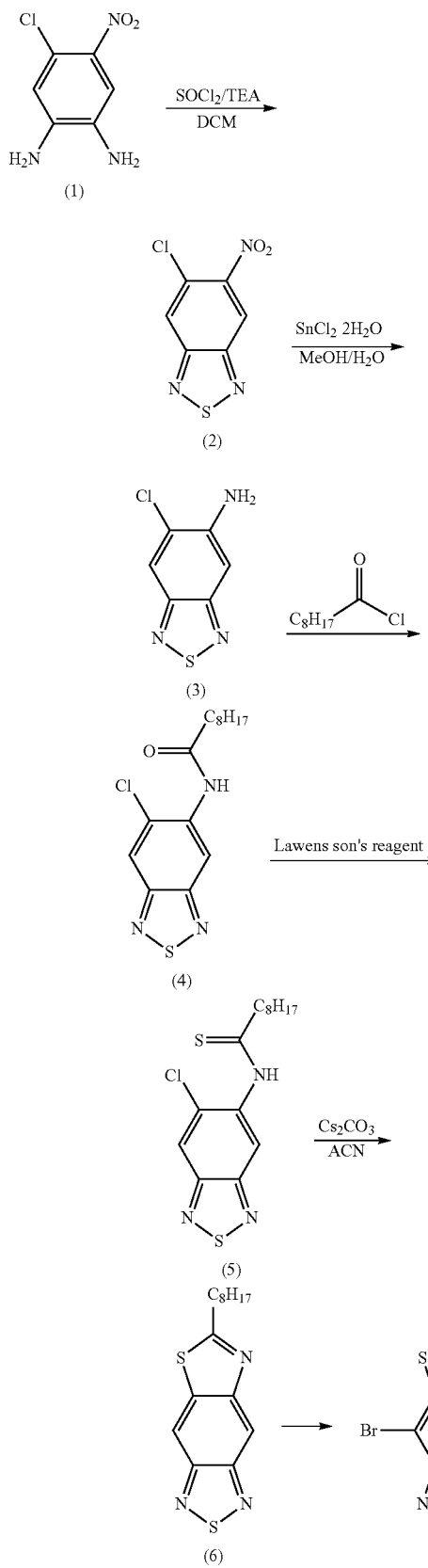

EXAMPLE A

Synthesis of 5-chloro-6-nitrobenzo[c][1,2,5]thiadiazole (2)

A solution obtained by dissolving 4-chloro-5-nitrobenzene-1,2-diamine (1) (15 g, 0.0799 mol) in 500 mL of dichloromethane (DCM) is cooled down to 0° C., and thionyl chloride ($SOCl_2$, 11.7 mL, 0.159 mol, 2.0 eq) is slowly dripped into the solution. The reactant is agitated and reflowed for 16 hours, cooled down to room temperature, and condensed under a reduced pressure. The condensate is dissolved again in dichloromethane, cleaned with a saturated $NaHCO_3$ aqueous solution, and subfractionated. An organic layer is dried, condensed under a reduced pressure, and passed through a silica column so as to obtain thin brown solid-phase compound (2) (15 g, yield: 87%). $^1$H NMR (400 MHz, $CDCl_3$): δ ppm 8.49 (s, 1H), 8.26 (s, 1H).

EXAMPLE B

Synthesis of 6-chlorobenzo[c][1,2,5]thiadiazole-5-amine (3)

A solution is prepared by dissolving a compound (2) (16.8 g, 0.0779 mol) in methanol (800 mL), and $SnCl_2.2H_2O$ (87 g, 0.389 mol, 5.0 eq), water (80 mL) and 1N HCl (30 mL) are sequentially put into the solution. The reactant is agitated and reflowed overnight, cooled down to room temperature (24° C.), and condensed under a reduced pressure. The condensate is dissolved in dichloromethane, neutralized with a saturated $NaHCO_3$ aqueous solution, and then passed through Celite. An organic layer is dried and condensed under a reduced pressure so as to obtain a yellow solid-phase compound (3) (13.8 g, yield: 95%). $^1$H NMR (400 MHz, $CDCl_3$): δ ppm 7.99 (s, 1H), 7.14 (s, 1H), 4.54 (br s, 2H).

EXAMPLE C

Synthesis of N-(6-chlorobenzo[c][1,2,5]thiadiazol-5-yl) nonaneamide

A solution prepared by dissolving a compound (3) (13.8 g, 0.0743 mol) in dichloromethane (500 mL) is cooled down to 0° C., and diisopropylethylamine (DIPEA) (38 mL, 3 eq) and nonanoyl chloride (27 mL, 0.148 mol, 2 eq) are added to the solution. When a reaction is terminated after the reactant is agitated at room temperature (24° C.) for 3 hours, the reactant is cleaned with a saturated $NaHCO_3$ aqueous solution. An organic layer is dried, condensed under a reduced pressure, and passed through a silica column so as to obtain a yellow solid-phase compound (4) (11 g, yield: 46%). $^1$H NMR (400 MHz, $CDCl_3$): δppm 9.12 (s, 1H), 8.10 (s, 1H), 7.90 (s, 1H), 2.51 (t, 2H), 1.81 (quint, 2H), 1.28 (m, 10H), 0.88 (t, 3H).

EXAMPLE D

Synthesis of N-(6-chlorobenzo[c][1,2,5]thiadiazol-5-yl)nonanthioamide (5)

A solution is prepared by dissolving a compound (4) (11 g, 0.0337 mol) in toluene (1000 mL) and a Lawesson's reagent (13.6 g, 0.0337 mol, 1 eq) is added to the solution, and the resultant solution is agitated and reflowed. The reactant is cooled down to room temperature (24° C.), condensed under a reduced pressure, and passed through a silica column so as to obtain a yellow solid-state compound (5) (9.3 g, yield: 80%). $^1$H NMR (400 MHz, CDCl$_3$): δ ppm 9.76 (s, 1H), 9.19 (s, 1H), 8.16 (s, 1H), 2.94 (t, 2H), 1.93 (quint, 2H), 1.28 (m, 10H), 0.85 (t, 3H)

EXAMPLE E

Synthesis of 2-octylthiazolo[5,6-q]benzo-2',1',3'-thiadiazole (6)

A solution is prepared by dissolving a compound (5) (9.3 g, 0.027 mol) in acetonitrile (500 mL), and Cs$_2$CO$_3$ (26.5 g, 0.0816 mol, 3 eq) is added to the solution, and the resultant solution is agitated at 70° C. for 2 hours. When the reaction is terminated, the reactant is cooled down to room temperature (24° C.), condensed under a reduced pressure concentrate, and passed through a silica column so as to obtain a yellow solid-state compound (6) (6.6 g, yield: 80%). $^1$H NMR (400 MHz, CDCl$_3$): δ ppm 8.53 (s, 1H), 8.43 (s, 1H), 8.16 (s, 1H), 3.13 (t, 2H), 1.91 (quint, 2H), 1.49-1.26 (m, 10H), 0.88 (t, 3H), Mass (ESI) m/z calcd for (C$_{15}$H$_{19}$N$_3$S$_2$) 305.10; found 306.0 (M+H)

EXAMPLE F

Synthesis of 2'-octylthiazolo[5,6-q]benzo-2,1,3-thiazole-4,7-dibromide (7)

A solution is prepared by dissolving a compound (6, 1.0 g) in chloroform (10 mL), and N-bromosuccinimide (1.3 g) is added to the solution, and the resultant solution is agitated at 45° C. for 30 minutes and at 50° C. for 90 minutes. The reactant is condensed under a reduced pressure, and passed through a silica column so as to obtain a yellow solid-state compound (7). $^1$H NMR (300 MHz, CDCl$_3$): δ ppm 3.17 (t, 2H), 1.94 (m, 2H), 1.47 (m, 2H), 1.29 (m, 8H), 0.89 (t, 3H). $^{13}$C NMR (75.5 MHz, CDCl3): δ ppm 178.0, 152.8, 151.9, 150.2, 142.5, 105.3, 103.2, 35.5, 31.8, 29.7, 29.2, 29.2, 29.1, 22.6, 14.1. Mass (Maldi) m/z calcd for (C$_{15}$H$_{17}$Br$_2$N$_3$S$_2$) 460.923; found 461.795 (M+H).

EXAMPLE 1-2

Synthesis of Organic Semiconductor Compound (Polymer)

Poly(2'-octylthiazolo[5,6-g]benzo-2,1,3-thiadiazolyl)-3,3'''-didodecyl-quarterthiophene (PTBTDQT) is synthesized based on the following Reaction Scheme 2.

[Reaction Scheme 2]

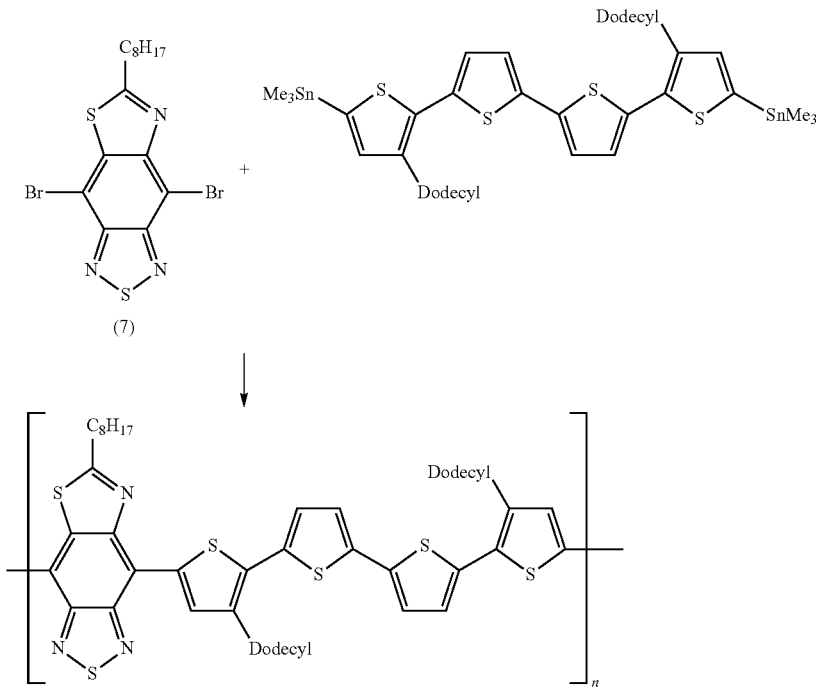

In Reaction Scheme 2, n denotes a polymerization degree and is determined based on a molecular weight.

The compound (7) (106 mg, 0.229 mmol) obtained according to Example 1-1 and 3,3'''-didodecyl-5,5'''-di(trimethylstannyl)-quarterthiophene (220 mg, 0.222 mmol) are dissolved in a mixed solution of dimethyl formamide (12 mL) and tetrahydrofuran (12 mL), and the solution is heated at 82° C. Tetrakis(triphenylphosphine)palladium (26 mg, 0.023 mmol) is added to the resultant solution and then heated for 60 minutes. 2-tributylstannyl-thiophene (0.7 mL) is added and agitated for 2 hours, and then the reaction is terminated by adding an excessive amount of methanol thereto. The reactant is cooled down to room temperature (24° C.) and then precipitated polymer is filtrated. The precipitated polymer is dissolved in chloroform and cleaned sequentially with 0.1N HCl aqueous solution, water, and 0.5N NH$_4$OH aqueous solution, and water at about 40° C. for 24 hours each. A polymer precipitate obtained by condensing an organic layer under a reduced pressure is cleaned with methanol, acetone, hexane and dichloromethane through a Soxhlet extraction method, and then the resultant solution is condensed by extracting it with chloroform so as to obtain a polymer ((Mw/Mn (GPC)=27153/17202. UV-vis-NIR: 730 nm).

Figure 3:
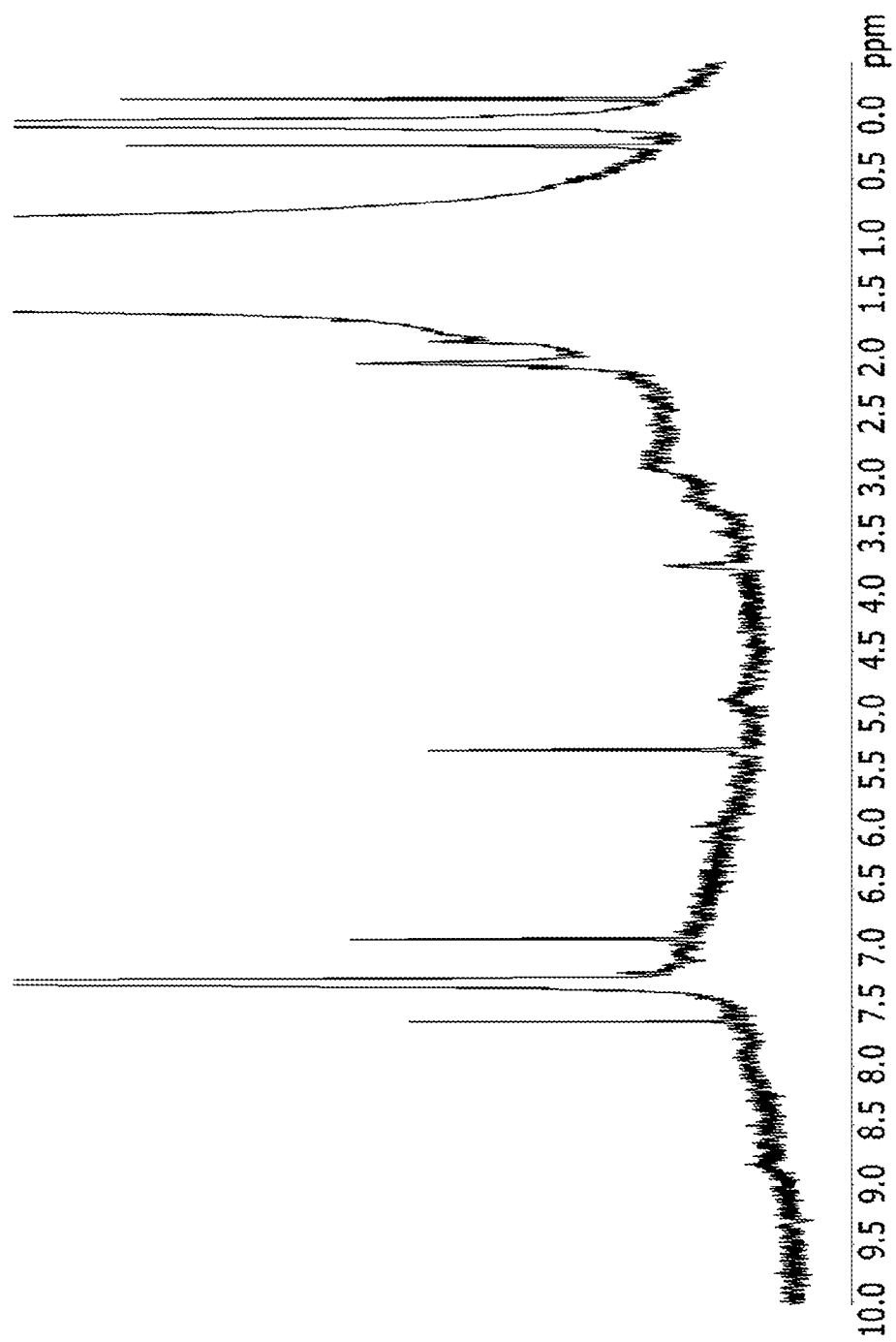
Figure 4:
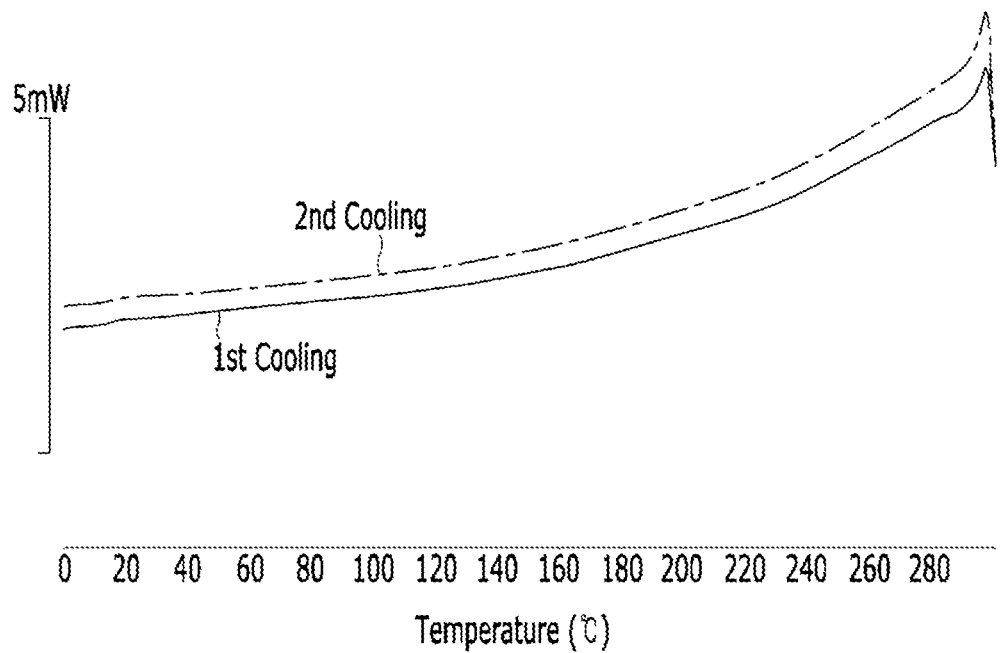

$^1$H NMR (measured with Bruker Avance Digital 300) of the polymer obtained according to Example 1 is illustrated in FIG. 3. Also, DSC (Differential Scanning calorimetry) analysis result (measured with METTLER TOLEDO DSC1) of the polymer of Example 1 is illustrated in FIG. 4. It may be seen from no peak appearing in FIG. 4 that the polymer obtained according to Example 1 is amorphous and has desirable thermal stability.

Figure 5:
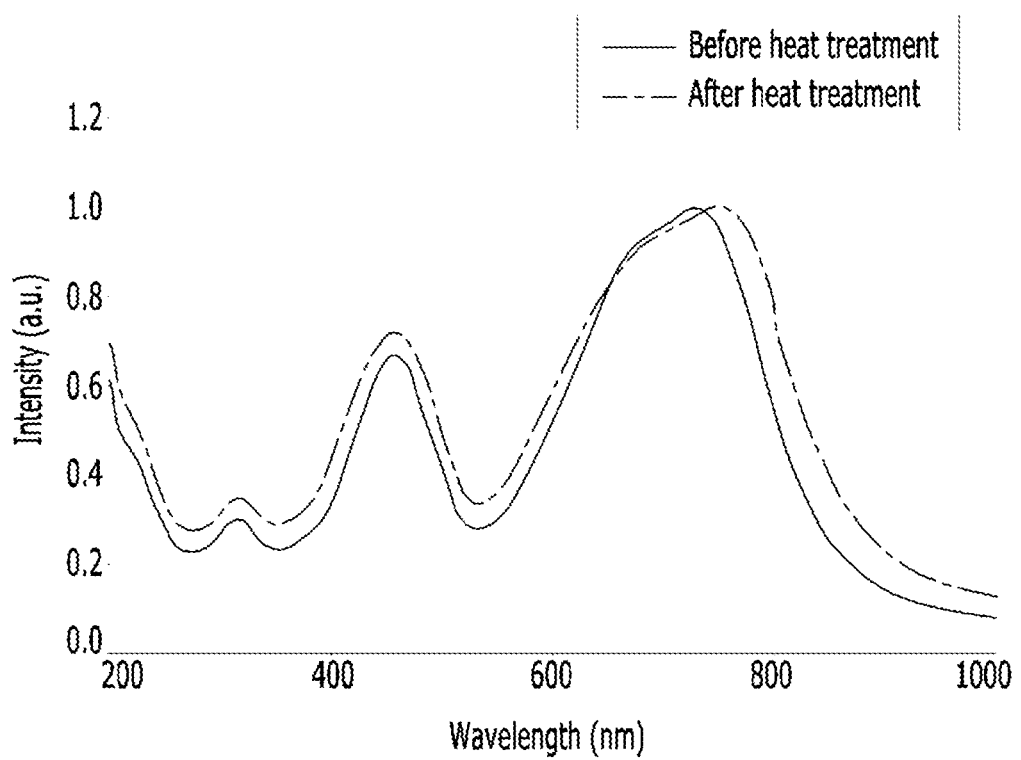
FIG. 5 shows an UV absorption spectrum of the film manufactured using the polymer according to Example 1.

The polymer obtained according to Example 1 is dissolved in chlorobenzene and then a film is manufactured. The UV absorption spectra of the film before heat treatment and after heat treatment at 100° C. are shown in FIG. 5. It may be seen from FIG. 5 that after the heat treatment, the peak at about 730 nm slightly moves toward a longer wavelength and this signifies that the polymer is arrayed based on the interaction between the molecules.

EXAMPLE 2

Fabrication of OTFT Device Using Polymer Semiconductor (PTBTDQT)

OTFT is fabricated in a "top contact" configuration on a highly doped n-type Si wafer (<0.004 Ωcm) with a 300 nm thermally grown SiO$_2$ (C$_i$=10 nFcm$^{-2}$). This wafer is cleaned in piranha solution for 30 minutes, rinsed with deionized water and dried under a nitrogen stream. This wafer is surface-treated with dense octadecyltrichlorosilane (ODTS) self-assembly monolayers (SAMs). A thin film PTBTDQT as an active layer is spin-coated on the Si/SiO$_2$ substrates at ambient condition and baked for 1 hour at 100° C. under nitrogen atmosphere. On top of the organic thin film, gold films (100 nm) as drain and source electrodes are deposited through a shadow mask. The drain-source channel length (L) and width (W) are 100 μm and 1000 μm, respectively. Characteristics of the OFET devices are measured at room temperature under ambient conditions with a Keithley 4200-SCS semiconducting parameter analyzer. Field-effect mobility (μFET) is calculated in the saturation (V$_d$=−40 V) or linear regime (V$_d$=−10 V) of the I$_d$.

The charge mobility of the OTFTs fabricated using the polymer (PTBTDQT) is measured as follows.

The charge mobility is calculated from the following Equation 1 for the saturation region using the current transfer curve. That is, the current equation for the saturation region is converted into a graph relating (I$_{SD}$)$^{1/2}$ and V$_G$, and the charge mobility is calculated from the slope of the converted graph.

$$I_{SD} = \frac{WC_0}{2L}\mu(V_G - V_T)^2 \quad \text{[Equation 1]}$$

$$\sqrt{I_{SD}} = \sqrt{\frac{\mu C_0 W}{2L}}(V_G - V_T)$$

$$\text{slope} = \sqrt{\frac{\mu C_0 W}{2L}}$$

$$\mu_{FET} = (\text{slope})^2 \frac{2L}{C_0 W}$$

In Equation 1, I$_{SD}$ is source-drain current, μ or μFET is charge mobility, Co is oxide film capacitance, W is the channel width, L is the channel length, VG is the gate voltage, and VT is the threshold voltage.

Figure 6:
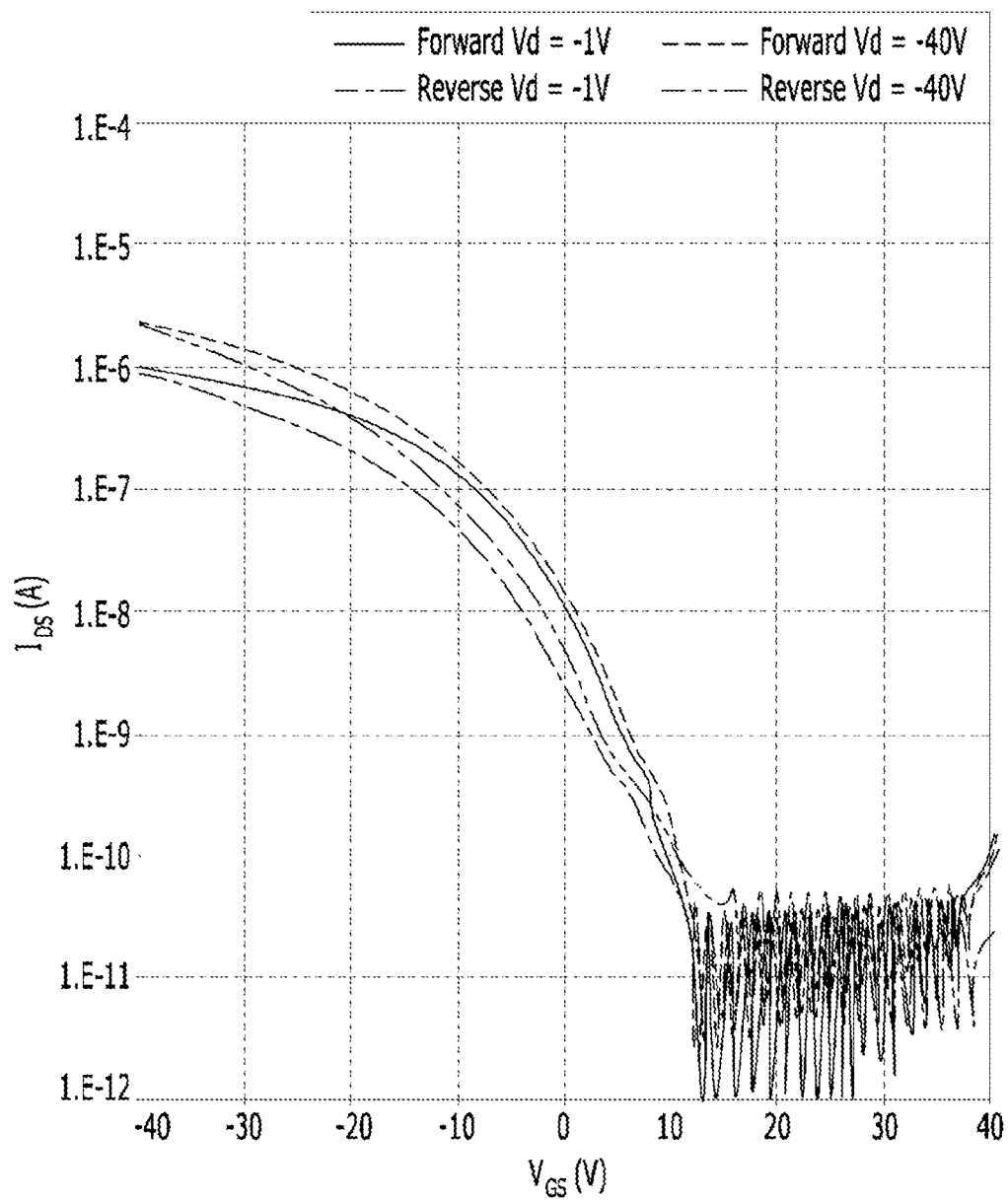
FIG. 6 is a graph showing field-effect mobility (FET) of the organic thin film transistor (OTFT) according to Example 2.

FIG. 6 shows FET characteristics of PTBTDQT based devices (L=100 μm, W=1000 μm) fabricated on an octadecyltrichlorosilane (ODTS)-treated Si/SiO$_2$ substrate at T$_{sub}$=room temperature.

The mobility obtained in the saturation region is about 0.026 cm$^2$/Vs, which is a reasonable value, but the device fabricating condition has not yet reached its highest potential.

While this disclosure has been described in connection with what is presently considered to be practical example embodiments, it is to be understood that the inventive concepts are not limited to the disclosed example embodiments, but, on the contrary, is intended to cover various modifications and equivalent arrangements included within the spirit and scope of the appended claims.

What is claimed is:

1. An organic semiconductor compound comprising a structural unit represented by the following Chemical Formula 1:

[Chemical Formula 1]

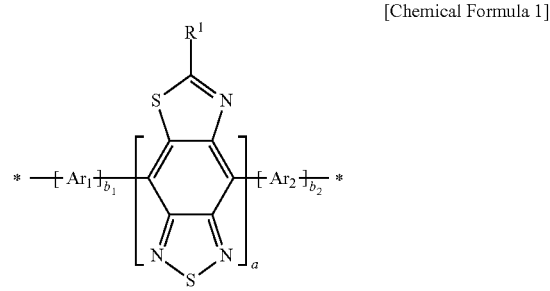

wherein, in Chemical Formula 1,
R$^1$ is selected from one of hydrogen, a halogen (one of —F, —Cl, —Br, and —I), a substituted or unsubstituted linear or branched C$_1$ to C$_{30}$ alkyl group, a substituted or unsubstituted linear or branched C$_2$ to C$_{30}$ alkenyl group, a substituted or unsubstituted linear or branched C$_2$ to C$_{30}$ alkynyl group, a substituted or unsubstituted C$_7$ to C$_{30}$ arylalkyl group, a substituted or unsubstituted C$_6$ to C$_{30}$ aryl group, a substituted or unsubstituted C$_1$ to C$_{30}$ alkoxy group, a substituted or unsubstituted C$_6$ to C$_{30}$ aryloxy group (—OR$^{11}$, wherein R$^{11}$ is a substituted or unsubstituted C$_6$ to C$_{30}$ aryl group), a substituted or unsubstituted C$_4$ to C$_{30}$ cycloalkyl group, a substituted or unsubstituted C$_4$ to C$_{30}$ cycloan alkyloxy group (—OR$^{12}$, wherein R$^{12}$ is a substituted or unsubstituted C$_4$ to C$_{30}$ cycloalkyl group), a substituted or unsubstituted C$_2$ to C$_{30}$ heteroaryl group, an acyl group (—C(=O)R$^{13}$, wherein R$^{13}$ is a substituted or unsubstituted C$_1$ to C$_{30}$ alkyl group), a sulfonyl group (—S(=O)R$^{14}$, wherein R$^{14}$ is a substituted or unsubstituted C$_1$ to C$_{30}$ alkyl group), and a carbamate group (—NH$_2$COOR$^{15}$, wherein R$^{15}$ is a substituted or unsubstituted C$_1$ to C$_{30}$ alkyl group), each of —Ar$_1$— and —Ar$_2$— are independently one of substituted or unsubstituted C$_4$ to C$_{20}$ aromatic ring, a substituted or unsubstituted C$_4$ to C$_{14}$ heteroaromatic ring and a substituted or unsubstituted $C_6$ to $C_{30}$ condensed polycyclic group including a heteroaromatic ring, provided that —$Ar_1$— and —$Ar_2$— are not a thiazolo[4,5-g]-benzo-2',1',3'-thiadiazole structural unit, and $a$, $b_1$, and $b_2$ represent a mole ratio of each structural unit, a ranges from about 1 mol % to about 99 mol %, and $b_1+b_2$ ranges from about 1 mol % to about 99 mol % based on 100 mol % of $a$, $b_1$, and $b_2$.

2. The organic semiconductor compound of claim 1, wherein the —$Ar_1$— and —$Ar_2$— structural unit is one of the structural units represented by the following Chemical Formula 2:

[Chemical Formula 2]

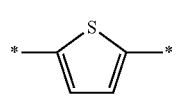  (1)

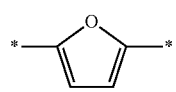  (2)

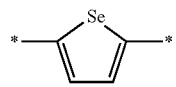  (3)

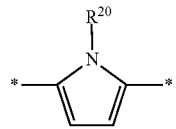  (4)

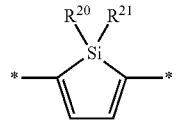  (5)

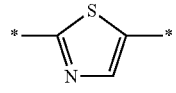  (6)

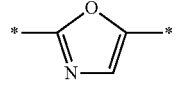  (7)

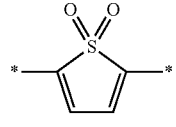  (8)

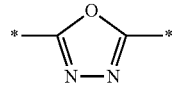  (9)

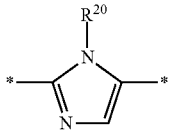  (10)

-continued

  (11)

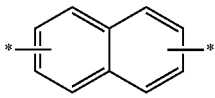  (12)

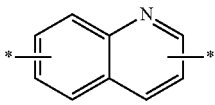  (13)

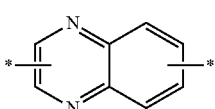  (14)

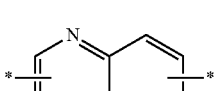  (15)

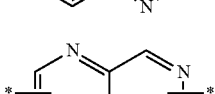  (16)

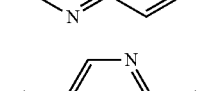  (17)

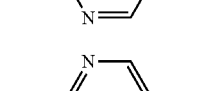  (18)

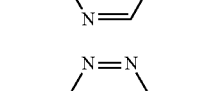  (19)

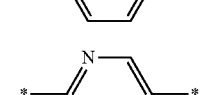  (20)

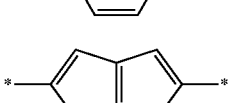  (21)

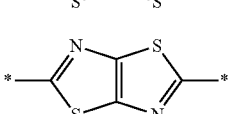  (22)

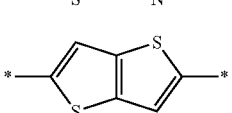  (23)

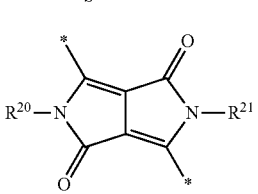  (24)

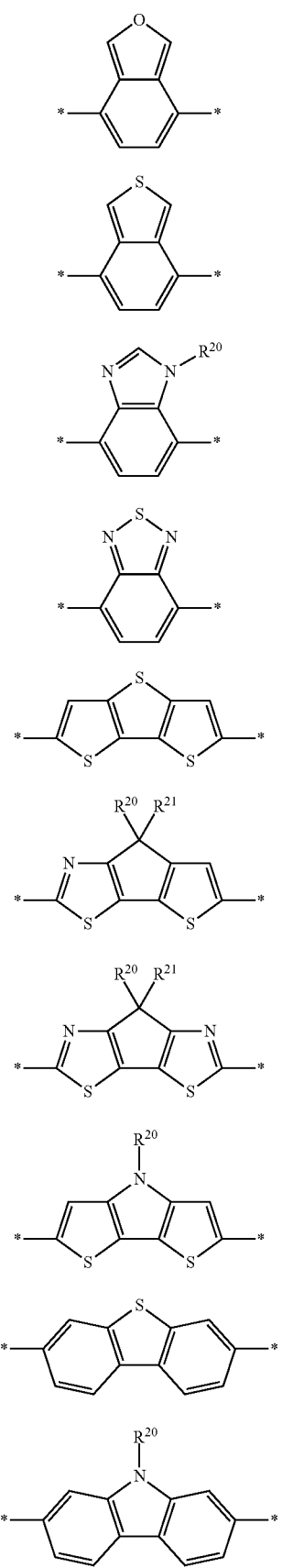
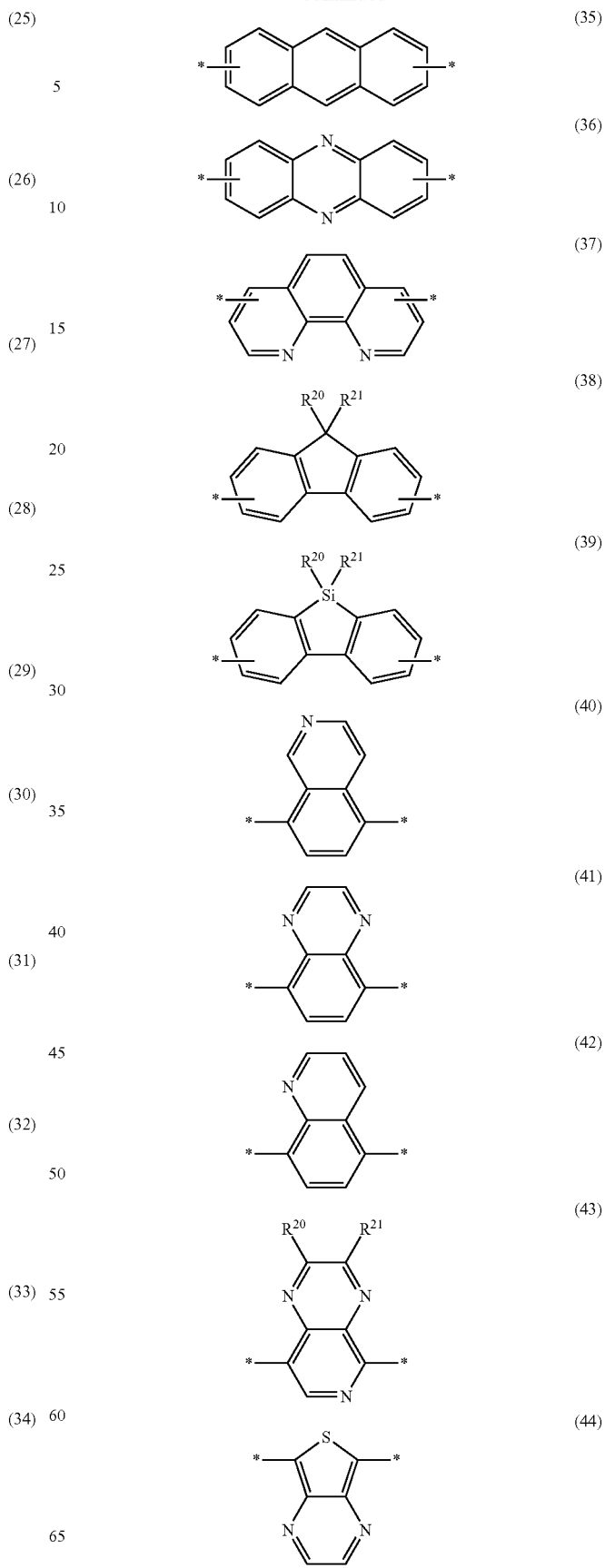

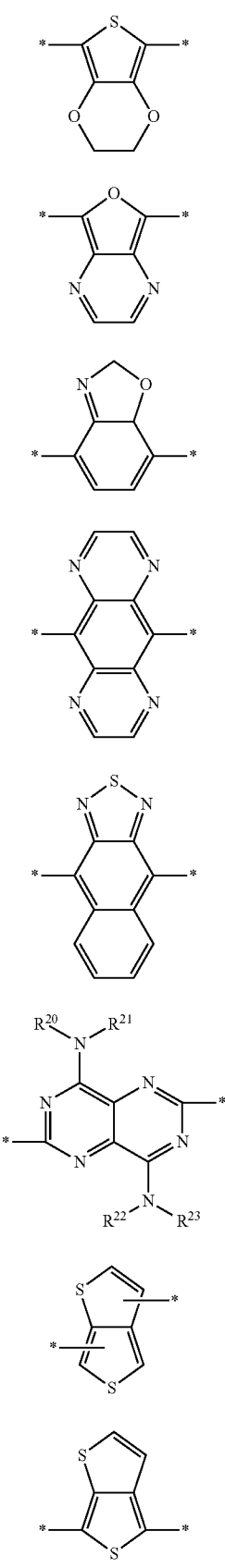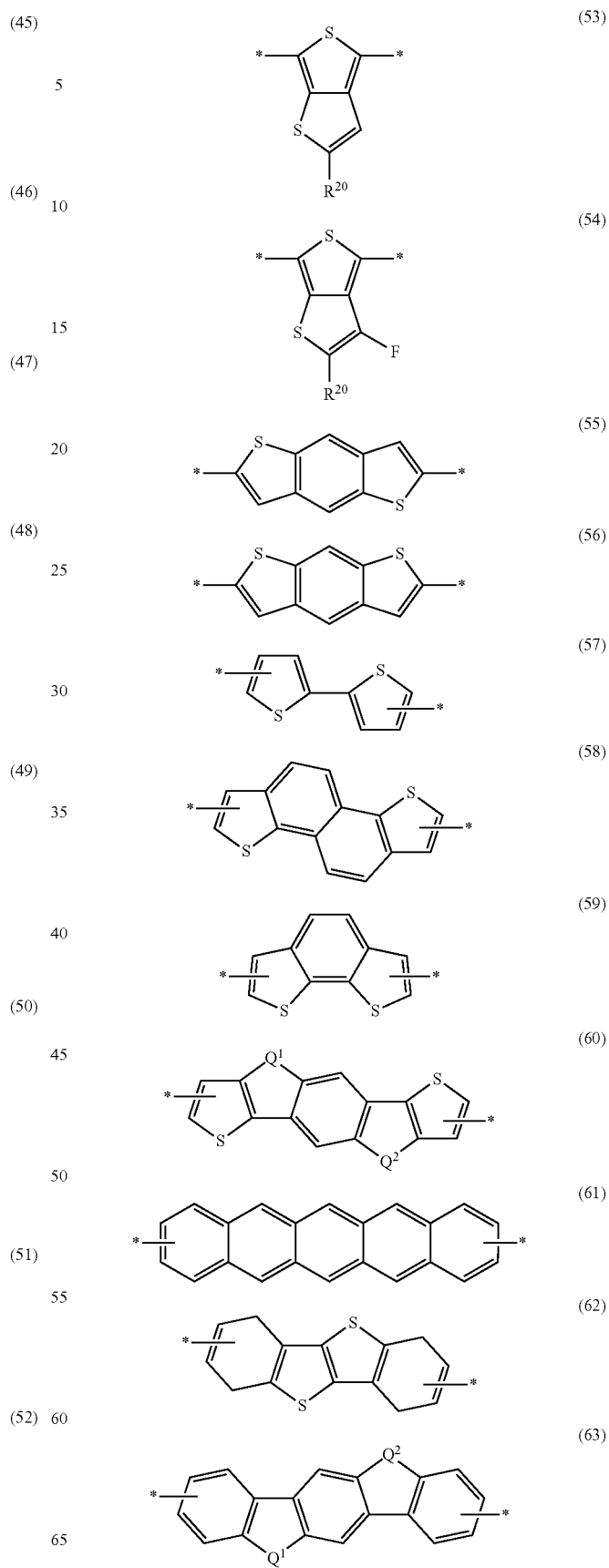

(64)

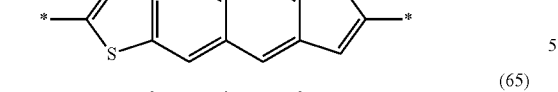

(65)

wherein, in Chemical Formula 2, each of $R^{20}$ to $R^{23}$ are independently selected from hydrogen, a substituted or unsubstituted $C_1$ to $C_{20}$ linear or branched alkyl group, a substituted or unsubstituted $C_3$ to $C_{20}$ cycloalkyl group, a substituted or unsubstituted $C_1$ to $C_{20}$ alkoxy group, a substituted or unsubstituted $C_6$ to $C_{30}$ aryl group, and a substituted or unsubstituted $C_2$ to $C_{30}$ heteroaryl group, and each of $Q^1$ and $Q^2$ are independently selected from one of S, $CR^{24}R^{25}$, $NR^{26}$ and $SiR^{27}R^{28}$, wherein each of $R^{24}$ to $R^{28}$ are independently hydrogen, a substituted or unsubstituted $C_1$ to $C_{15}$ linear or branched alkyl group, a substituted or unsubstituted $C_3$ to $C_{15}$ cycloalkyl group, a substituted or unsubstituted $C_1$ to $C_{15}$ alkoxy group, a substituted or unsubstituted $C_6$ to $C_{15}$ aryl group, a substituted or unsubstituted $C_2$ to $C_{15}$ heteroaryl group, and a combination thereof, or a hydrogen atom of —CH— or —CH$_2$— positioned in the aromatic ring or heteroaromatic ring of the above Chemical Formula 2 is optionally substituted with one selected from a fluoro group, a $C_1$ to $C_{10}$ fluoroalkyl group, a $C_1$ to $C_{20}$ linear or branched alkyl group, a $C_3$ to $C_{20}$ cycloalkyl group, a $C_1$ to $C_{20}$ alkoxy group, a substituted or unsubstituted $C_6$ to $C_{30}$ aryl group, and a substituted or unsubstituted $C_2$ to $C_{30}$ heteroaryl group.

3. The organic semiconductor compound of claim 1, wherein the —Ar$_1$— and —Ar$_2$— structural unit are each independently a structural unit represented by the following Chemical Formula 3 including a substituted or unsubstituted thiophene structural unit:

[Chemical Formula 3]

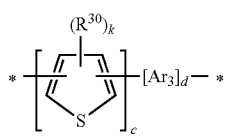

wherein, in Chemical Formula 3, $R^{30}$ is one of hydrogen, a substituted or unsubstituted $C_4$ to $C_{20}$ aromatic ring, a substituted or unsubstituted $C_1$ to $C_{20}$ linear or branched alkyl group, a substituted or unsubstituted $C_3$ to $C_{20}$ cycloalkyl group, a substituted or unsubstituted $C_1$ to $C_{20}$ alkoxy group, a substituted or unsubstituted $C_6$ to $C_{30}$ aryl group, a substituted or unsubstituted $C_2$ to $C_{30}$ heteroaryl group, and a combination thereof, or at least one CH$_2$ group of the foregoing groups is substituted with —O—, —S—, —S(=O)$_2$—, —C(=O)—, —OC(=O)—, —C(=O)O—, —R$^{31}$C=CR$^{32}$—, —C≡C— and —SiR$^{33}$R$^{34}$— (wherein, each of R$^{31}$ to R$^{34}$ are independently hydrogen, a substituted or unsubstituted $C_1$ to $C_{20}$ linear or branched alkyl group, a substituted or unsubstituted $C_3$ to $C_{20}$ cycloalkyl group, a substituted or unsubstituted $C_1$ to $C_{20}$ alkoxy group, a substituted or unsubstituted $C_6$ to $C_{30}$ aryl group, and a substituted or unsubstituted $C_2$ to $C_{30}$ heteroaryl group), k is an integer of 1 or 2, —Ar$_3$— is one of a substituted or unsubstituted $C_4$ to $C_{20}$ aromatic ring, a substituted or unsubstituted $C_4$ to $C_{14}$ heteroaromatic ring, and a substituted or unsubstituted $C_6$ to $C_{30}$ condensed polycyclic group including a heteroaromatic ring, provided that —Ar$_3$— is not a thiazolo[4,5-g]-benzo-2',1',3'-thiadiazole structural unit, and c and d represent a mole ratio of each structural unit, c ranges from about 1 mol % to about 99 mol %, and d ranges from 1 to from 99 mol % based on 100 mol % of c and d.

4. The organic semiconductor compound of claim 1, wherein the organic semiconductor compound comprises one of terminal functional groups represented by the following Chemical Formulas 4 to 7:

[Chemical Formula 4]

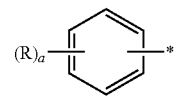

wherein, in Chemical Formula 4,

R is one of a fluoro group and a $C_1$ to $C_{20}$ perfluoroalkyl group, and a is an integer ranging from 1 to 5,

[Chemical Formula 5]

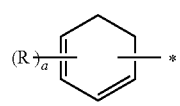

wherein, in Chemical Formula 5,

R is one of a fluoro group and a $C_1$ to $C_{20}$ perfluoroalkyl group, and a is an integer ranging from 1 to 6,

[Chemical Formula 6]

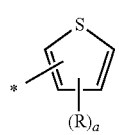

wherein, in Chemical Formula 6,

R is one of a fluoro group and a $C_1$ to $C_{20}$ perfluoroalkyl group, and a is an integer ranging from 1 to 3, and

[Chemical Formula 7]

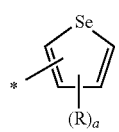

wherein, in Chemical Formula 7,

R is one of a fluoro group and a $C_1$ to $C_{20}$ perfluoroalkyl group, and a is an integer ranging from 1 to 3.

5. An organic thin film comprising the organic semiconductor compound according to claim 1.

6. An electronic device comprising the organic semiconductor compound according to claim 1.

7. The electronic device of claim 6, wherein the electronic device is selected from a transistor, an organic light emitting diode (OLED), a photovoltaic device, a solar cell, a laser device, a memory, and a sensor.

8. A method of manufacturing an organic thin film, the method comprising:
depositing an organic semiconductor compound on a substrate or
dissolving the organic semiconductor compounds in an organic solvent and then coating the same at room temperature,
wherein the organic semiconductor compound is represented by the following Chemical Formula 1:

[Chemical Formula 1]

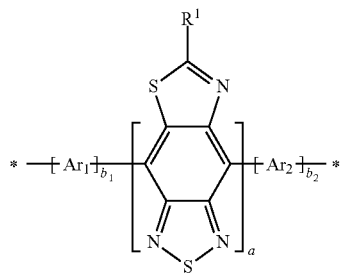

wherein, in Chemical Formula 1,
$R^1$ is selected from one of hydrogen, a halogen (one of —F, —Cl, —Br, and —I), a substituted or unsubstituted linear or branched $C_1$ to $C_{30}$ alkyl group, a substituted or unsubstituted linear or branched $C_2$ to $C_{30}$ alkenyl group, a substituted or unsubstituted linear or branched $C_2$ to $C_{30}$ alkynyl group, a substituted or unsubstituted $C_7$ to $C_{30}$ arylalkyl group, a substituted or unsubstituted $C_6$ to $C_{30}$ aryl group, a substituted or unsubstituted $C_1$ to $C_{30}$ alkoxy group, a substituted or unsubstituted $C_6$ to $C_{30}$ aryloxy group (—$OR^{11}$, wherein $R^{11}$ is a substituted or unsubstituted $C_6$ to $C_{30}$ aryl group), a substituted or unsubstituted $C_4$ to $C_{30}$ cycloalkyl group, a substituted or unsubstituted $C_4$ to $C_{30}$ cycloan alkyloxy group (—$OR^{12}$, wherein $R^{12}$ is a substituted or unsubstituted $C_4$ to $C_{30}$ cycloalkyl group), a substituted or unsubstituted $C_2$ to $C_{30}$ heteroaryl group, an acyl group (—C(=O)$R^{13}$, wherein $R^{13}$ is a substituted or unsubstituted $C_1$ to $C_{30}$ alkyl group), a sulfonyl group (—S(=O)$R^{14}$, wherein $R^{14}$ is a substituted or unsubstituted $C_1$ to $C_{30}$ alkyl group), and a carbamate group (—$NH_2COOR^{15}$, wherein $R^{15}$ is a substituted or unsubstituted $C_1$ to $C_{30}$ alkyl group),
each of —$Ar_1$— and —$Ar_2$— are independently one of substituted or unsubstituted $C_4$ to $C_{20}$ aromatic ring, a substituted or unsubstituted $C_4$ to $C_{14}$ heteroaromatic ring and a substituted or unsubstituted $C_6$ to $C_{30}$ condensed polycyclic group including a heteroaromatic ring, provided that —$Ar_1$— and —$Ar_2$— are not a thiazolo[4,5-g]-benzo-2',1',3'-thiadiazole structural unit, and
a, $b_1$, and $b_2$ represent a mole ratio of each structural unit, a ranges from about 1 mol % to about 99 mol %, and $b_1+b_2$ ranges from about 1 mol % to about 99 mol % based on 100 mol % of a, $b_1$, and $b_2$.

* * * * *